United States Patent
Kohno et al.

(10) Patent No.: US 9,461,296 B2
(45) Date of Patent: Oct. 4, 2016

(54) SECONDARY BATTERY AND SECONDARY BATTERY MODULE

(75) Inventors: Ryuji Kohno, Mito (JP); Takuro Tsunaki, Mito (JP); Yutaka Sato, Hitachinaka (JP); Mitsuru Koseki, Fukaya (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 580 days.

(21) Appl. No.: 13/885,927

(22) PCT Filed: Nov. 30, 2010

(86) PCT No.: PCT/JP2010/071371
§ 371 (c)(1),
(2), (4) Date: Jun. 5, 2013

(87) PCT Pub. No.: WO2012/073331
PCT Pub. Date: Jun. 7, 2012

(65) Prior Publication Data
US 2013/0260212 A1    Oct. 3, 2013

(51) Int. Cl.
*H01M 2/04* (2006.01)
*H01M 2/06* (2006.01)
(Continued)

(52) U.S. Cl.
CPC ............ *H01M 2/30* (2013.01); *H01M 2/0404* (2013.01); *H01M 2/06* (2013.01); *H01M 2/204* (2013.01); *H01M 2/263* (2013.01)

(58) Field of Classification Search
CPC ...... H01M 2/30; H01M 2/0404; H01M 2/06; H01M 2/263; H01M 2/204
See application file for complete search history.

(56) References Cited

U.S. PATENT DOCUMENTS

| 3,823,037 A * | 7/1974 | Shimotake et al. .... H01M 2/10 429/150 |
| 2003/0017390 A1 * | 1/2003 | Probst .................... A61N 1/375 429/176 |
| 2004/0265683 A1 * | 12/2004 | Merrill ................ H01M 2/0207 429/56 |

FOREIGN PATENT DOCUMENTS

| JP | 2009-104793 A | 5/2009 |
| JP | 2009-231145 A | 10/2009 |

(Continued)

OTHER PUBLICATIONS

Machine Translation of: JP 2009/277604 A, Kojima, Nov. 26, 2009.*

(Continued)

*Primary Examiner* — Kenneth Douyette
(74) *Attorney, Agent, or Firm* — Crowell & Moring LLP

(57) ABSTRACT

A secondary battery includes a battery casing accommodating an electricity-generating element group, and a battery cover having through-holes and sealing an opening in the battery casing. A first face at one end of each of positive and negative electrode connecting plates, which are each formed from a single plate of metal, is connected to a non-coated section of the electricity-generating element group. A second face at the other end of each of the positive and negative electrode connecting plates is a face onto which a busbar is welded, and the second face is exposed outward from one of the through-holes. Insulating base materials are interposed between THE positive and negative electrode connecting plates and an outer circumference of each through-hole, the insulating base materials and the battery cover are connected by brazing, and the insulating base materials and the positive and negative electrode connecting plates are connected by brazing.

13 Claims, 21 Drawing Sheets

(51) Int. Cl.
*H01M 2/30* (2006.01)
*H01M 2/20* (2006.01)
*H01M 2/26* (2006.01)

(56) References Cited

FOREIGN PATENT DOCUMENTS

| JP | 2009-252652 A | 10/2009 |
| JP | 2009-277604 A | 11/2009 |
| JP | 2010-97764 A | 4/2010 |

OTHER PUBLICATIONS

Machine Translation of: JP 2009-231145 A, Koiwa et al., Oct. 8, 2009.*
Japanese Office Action dated May 27, 2014, including English translation (eight (8) pages).

\* cited by examiner

SECONDARY BATTERY AND SECONDARY BATTERY MODULE

TECHNICAL FIELD

The present invention relates to a secondary battery and secondary battery module including external terminals exposed from the battery container.

BACKGROUND ART

In widely known secondary batteries for purposes such as driving a motor vehicle, an electricity-generating element assembly includes an electricity-generating element group with a positive electrode plate and a negative electrode plate arranged via separators, and an electrolyte wetting the electricity-generating element group. The electricity-generating element assembly is housed in a closed-end metallic battery casing, and an opening in this battery casing is sealed off with a metallic battery cover. Lithium-ion secondary batteries are typical such batteries.

Traditionally known rectangular lithium-ion secondary batteries each include: a rectangularly parallelepipedic closed-end battery casing having an open end (opening) of a substantially rectangular shape; a battery cover for sealing off the open end; and an electricity-generating element group constructed into a flat shape to match the shape of a space defined by the battery casing and the battery cover. In secondary batteries of this kind, terminals for connection to the outside of the battery are mounted on the battery cover so as to be exposed on the outside and are electrically connected to the electricity-generating element group, within the battery casing, by an electrically conductive member.

To mount the terminals on the battery cover, it is necessary to ensure electrical insulation between both and airtightness between spatial clearances. In order to satisfy these requirements, the secondary battery disclosed in Patent Document 1, for example, includes a battery casing and terminals having a connecting plane perpendicular to a principal plane of a battery cover, the battery casing and the terminals being placed at relative positions in a mold and then formed by injection molding with a sealing material (resin).

PRIOR ART LITERATURE

Patent Document

Patent Document 1: JP-2009-104793-A

SUMMARY OF THE INVENTION

Problem to be Solved by the Invention

The secondary battery described in Patent Document 1, however, has had the following problem:

Since the connecting plane of the terminals is perpendicular to the principal plane of the battery cover, making an attempt to obtain a sufficient connection area would stretch the terminals upward over the battery and thus oversize the battery.

Means for Solving the Problem (1) A secondary battery according to claim 1 of the present invention includes: an electricity-generating element group formed by stacking in layers via separators a positive electrode plate coated with a positive electrode active material, and a negative electrode plate coated with a negative electrode active material, the electricity-generating element group further including portions, of the positive electrode plate and negative electrode plate, that are not coated with the positive electrode active material or negative electrode active material; a battery container accommodating the electricity-generating element group; and a positive electrode external terminal and a negative electrode external terminal, each exposed outward from one of two through-holes, one for a positive electrode and the other for a negative electrode, in the battery container in order to conduct electric power charging/discharging between the electricity-generating element group and an external load, wherein: a positive electrode connecting plate and a negative electrode connecting plate are each fabricated from a single blank material and connected to the electricity-generating element group; an electricity-generating element connection portion connected to the electricity-generating element group is formed on a first face at one end of each of the positive and negative electrode connecting plates; the positive or negative electrode external terminal is formed on a second face at the other end of each of the connecting plates; and the second faces of the positive and negative electrode connecting plates are exposed from the through-holes in parallel to an outer surface of the battery container.

(2) A secondary battery module according to claim 11 of the present invention includes: a plurality of secondary batteries arranged adjacently to and in parallel to each other, the secondary batteries each being the secondary battery of claim 1; and busbars electrically interconnecting the positive electrode external terminals and negative electrode external terminals of the adjacent secondary batteries; wherein the busbars are each formed from a cladding material whose main member, made of the same material as used in one of the positive and negative electrode external terminals, and whose subsidiary member, made of the same material as used in the other of the positive and negative electrode external terminals, are integrated, the main member or subsidiary member of one of the busbars that is made of the same material as used in the positive electrode external terminal is welded onto the positive electrode external terminal, and the main member or subsidiary member of the other of the busbars that is made of the same material as used in the negative electrode external terminal is welded onto the negative electrode external terminal.

Effects of the Invention

In accordance with the present invention, the secondary battery can be miniaturized since the positive and negative electrode external terminals extend in parallel to one face of the battery container.

MODE FOR CARRYING OUT THE INVENTION

First Embodiment

Hereunder, a first embodiment in which the present invention is applied to a rectangular lithium-ion secondary battery for driving a motor vehicle will be described referring to the accompanying drawings.

—Configuration of the Rectangular Secondary Battery—

Figure 1:
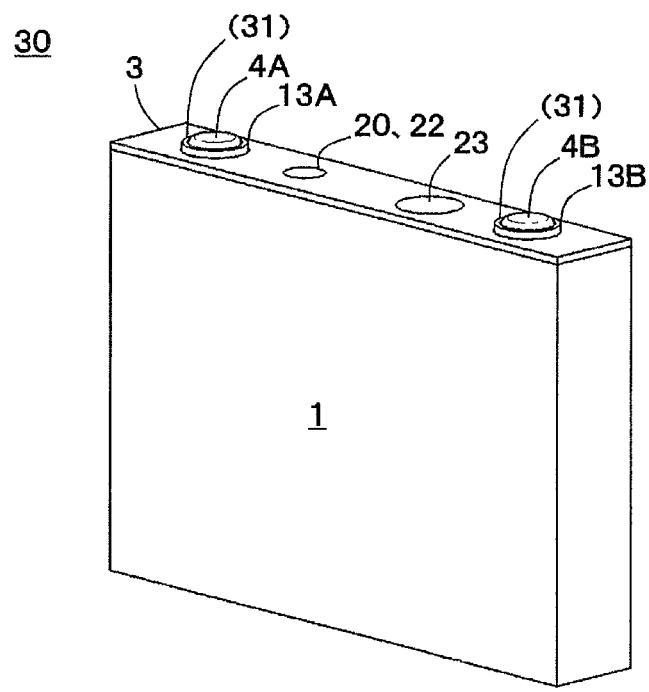
FIG. 1 is an external perspective view of a secondary battery according to a first embodiment of the present invention.
Figure 2:
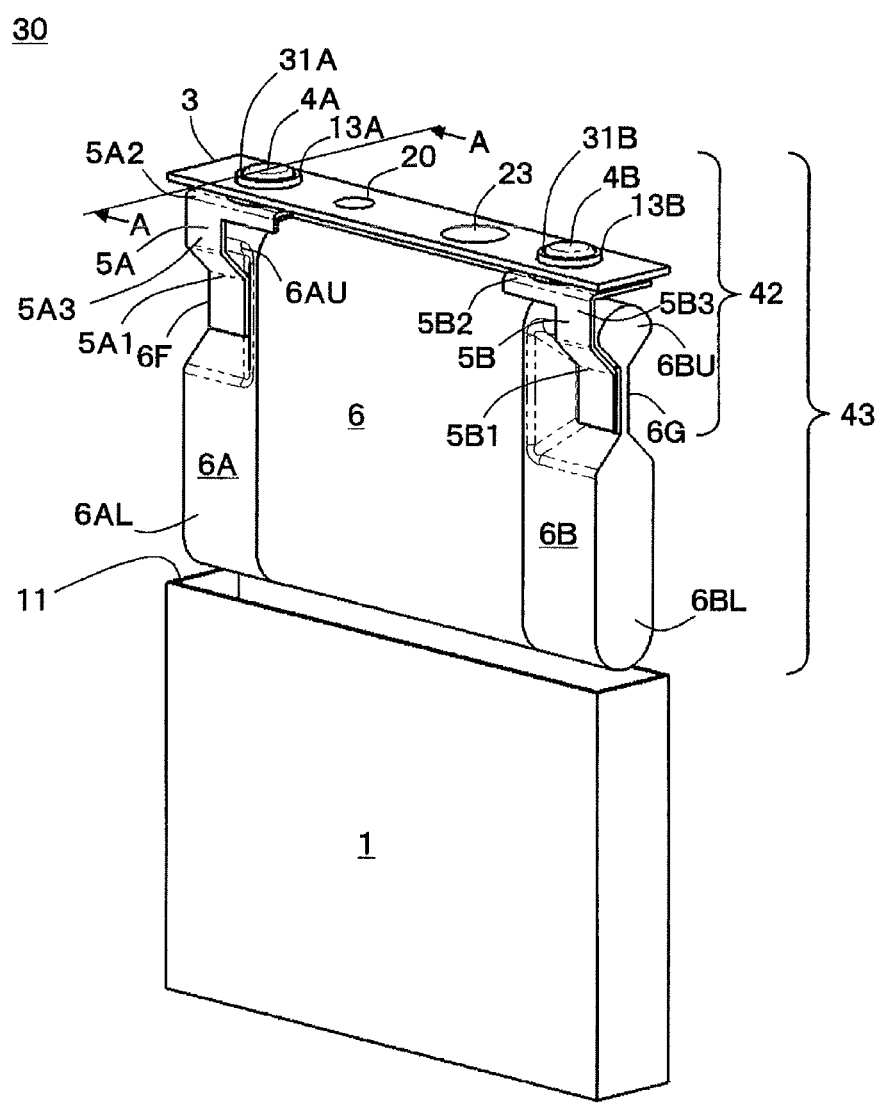
FIG. 2 is an exploded perspective view representing an internal configuration of the secondary battery according to the first embodiment of the present invention.

As shown in FIGS. 1 and 2, the rectangular secondary battery 30 is constructed by housing a wound-type electricity-generating element group 6 in a regularly parallelepipedic battery casing 1 having an open end, via an insulating casing not shown, and sealing off the opening 11 of the battery casing 1 with a battery cover 3. The battery casing 1 and the battery cover 3 constitute a battery container.

Although illustration is omitted, the electricity-generating element group 6 is housed in the bag-shaped insulating casing and then inserted into the battery casing 1. This protects the electricity-generating element group 6 and at the same time, ensures electrical insulation and heat transfer between an inner surface of the battery casing 1 and the electricity-generating element group 6. The insulating casing is formed from a resin material that has insulating properties, for example, polypropylene to have the regularly parallelepipedic, thin-walled shape at one open end.

A positive electrode external terminal 4A and a negative electrode external terminal 4B, both formed in an integral form with a positive electrode connecting plate 5A and a negative electrode connecting plate 5B, respectively, are exposed at the battery cover 3. As will be described later herein, the positive electrode external terminal 4A and the negative electrode external terminal 4B include a busbar connecting surface parallel to one face of the battery container. The positive electrode connecting plate 5A and the negative electrode connecting plate 5B are connected to the wound-type electricity-generating element group 6. Electric power that the wound-type electricity-generating element group 6 generates is output to the outside via the positive electrode connecting plate 5A and the negative electrode connecting plate 5B, and electric power generated in the outside will be stored into the wound-type electricity-generating element group 6 via the positive electrode connecting plate 5A and the negative electrode connecting plate 5B, for charging or recharging.

The positive electrode external terminal 4A, molded from one sheet of positive-electrode metal integrally at one end of the positive electrode connecting plate 5A, extends from the inside of the battery container, then extends through a through-hole 31A in the battery cover 3, and is exposed at the outside of the battery container. The negative electrode external terminal 4B, molded from one sheet of negative-electrode metal integrally at one end of the negative electrode connecting plate 5B, extends from the inside of the battery container, then extends through a through-hole 31B in the battery cover 3, and is exposed at the outside of the battery container. At the positive and negative electrode external terminals 4A and 4B, insulating base materials 13A and 13B are interposed between the external terminals 4A, 4B respectively and the battery cover 3, to electrically insulate both from one another. The insulating base materials 13A and 13B also seal up the through-holes 31A and 31B, respectively.

The positive electrode connecting plate 5A, molded integrally with the positive electrode external terminal 4A, is connected to the battery cover 3 via the insulating base material 13A by brazing, and the negative electrode connecting plate 5B, molded integrally with the negative electrode external terminal 4B, is connected to the battery cover 3 via the insulating base material 13B by brazing. That is to say, the positive and negative electrode connecting plates 5A, 5B, the insulating base materials 13A, 13B, and the battery cover 3 are mechanically connected together by brazing to be integrated as a battery cover assembly 42 (see FIG. 2). The battery cover assembly 42 is preassembled prior to assembly of the battery. An electricity-generating element assembly 43 (see FIG. 2), an integrated unit composed of the battery cover assembly 42 and the electricity-generating element group 6, is also fabricated prior to the assembly of the battery.

The battery casing 1, made of a metal, or an aluminum alloy in the present example, is a flat container formed by deep drawing to have a depth greater than a size of short sides of the opening 11. The battery cover 3, also made of a metal, or an aluminum alloy in the present example, is fixedly mounted at the opening 11 of the battery casing 1 by laser beam welding. The battery cover 3 is formed with a filling port 20, from which the battery casing 1 is filled with an electrolyte, and thereafter the filling port 20 is sealed off with a filler plug 22 by laser beam welding.

The electrolyte that wets the electricity-generating element group 6 is an organic solvent containing a carbonate ester, such as ethylene carbonate, with a lithium salt such as lithium hexafluorophosphate ($LiPF_6$) dissolved at a rate of about 1 mol/liter in the solvent.

As described above, the secondary battery 30 includes the battery casing 1 and the electricity-generating element assembly 43. These constituent members of the secondary battery are described in further detail below.

—Electricity-Generating Element Assembly—

The electricity-generating element assembly 43 is an integrated unit composed of the battery cover assembly 42 and the electricity-generating element group 6, as shown in FIG. 2. First, the electricity-generating element group 6 is described below.

—Electricity-Generating Element Group—

Figure 3:
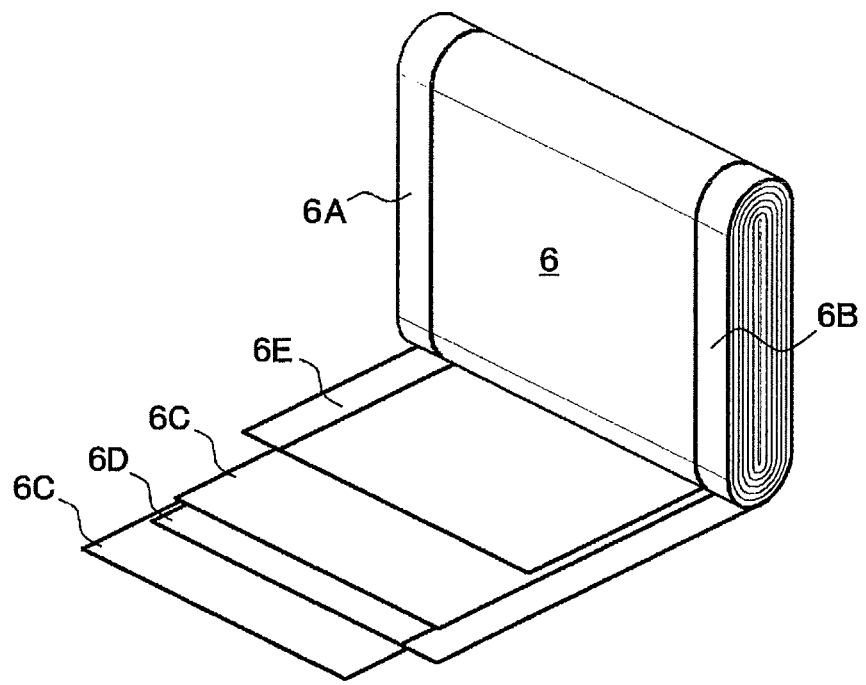
FIG. 3 is a perspective view of an electricity-generating element group used in the secondary battery according to the first embodiment of the present invention.

As shown in FIG. 3, the electricity-generating element group 6 has a flat, wound structure created by stacking a separator 6C, a negative electrode plate 6D, another separator 6C, and a positive electrode plate 6E, in that order, then winding this stack through a plurality of turns, and flattening the wound stack. This wound stack has no axial core for reduced weight. Instead, one of the two separators 6C wound through several turns at a leading edge of the wound stack (i.e., a central section of the electricity-generating element group) serves as an axial core. At a trailing edge of the wound stack (i.e., a surface section of the electricity-generating element group), the other separator 6C is wound through several turns to ensure electrical insulation. In addition, in order to prevent natural unwinding, one side of the wound stack trailing edge is sealed with a tape (not shown) that is coated with a pressure-sensitive adhesive beforehand.

The positive electrode plate 6E is fabricated by coating both an upper surface and lower surface of an aluminum alloy foil (positive-electrode current-collector foil) with a positive-electrode active material mixture at substantially equal, substantially uniform rates, the active material mixture containing a lithium-containing transition metals double oxide, such as lithium manganate, that serves as a positive-electrode active material. On both surfaces of the aluminum alloy foil, a non-coated positive electrode section 6A that is not coated with the positive-electrode active material mixture is formed along one side in a lengthwise direction of the positive electrode plate.

The negative electrode plate 6D is fabricated by coating both an upper surface and lower surface of a copper alloy foil (negative-electrode current-collector foil) with a negative-electrode active material mixture at substantially equal, substantially uniform rates, the active material mixture containing a carbon material, such as graphite, that can serve as a negative-electrode active material to occlude and release lithium ions. On both surfaces of the copper alloy foil, a non-coated negative electrode section 6B that is not coated with the negative-electrode active material mixture is formed along one side in a lengthwise direction of the negative electrode plate. The non-coated positive electrode section 6A and the non-coated negative electrode section 6B are provided at lateral edges of the electricity-generating element group 6 that are distant from each other in a cross direction of the element group 6.

Length of the negative electrode plate 6D is set to be greater than that of the positive electrode plate 6E so that when both electrode plates are wound, the positive electrode plate 6E does not overstep the negative electrode plate 6D in a winding direction at the innermost (leading) and outermost (trailing) edges of the wound stack structure.

The separators 6C are both constructed from a porous microsheet of material that enables lithium ions to pass through, the present example using a polyethylene sheet that is several tens of microns (μm) thick.

As shown in FIG. 2, connection portions at lower ends of the positive and negative electrode connecting plates 5A, 5B are connected by supersonic welding. Welds 6F and 6G on the non-coated positive and negative electrode sections 6A, 6B of the electricity-generating element group 6 are the welded connections. Electric power that has been stored into the electricity-generating element group 6 is supplied to an external load via the positive and negative electrode external terminals 4A, 4B integrally provided at upper ends of the positive and negative electrode connecting plates 5A, 5B, and electric power that has been generated in the outside charges the electricity-generating element group 6. As will be described later, the supersonic welds 6F and 6G on the non-coated positive and negative electrode sections 6A, 6B are regions where the stack structure of the positive and negative electrode plates 6D, 6E has been flattened out in advance.

Reference numbers 6AU, 6AL shown in FIG. 2 denote upper and lower folded end portions of the wound positive electrode plate 6E, and reference numbers 6BU, 6BL denote upper and lower folded end portions of the wound negative electrode plate 6D. Unlike the welds 6F, 6G, the upper and lower folded end portions 6AU, 6AL, 6BU, 6BL are not flattened. Instead, these folded ends assume folded surface shapes intact that have been formed during stacking when the positive and negative electrode plates 6D, 6E were wound through the plurality of turns. The welds 6F and 6G are therefore planar regions recessed from the upper and lower folded end portions 6AU, 6BU.

—Battery Cover Assembly—

Figure 4:
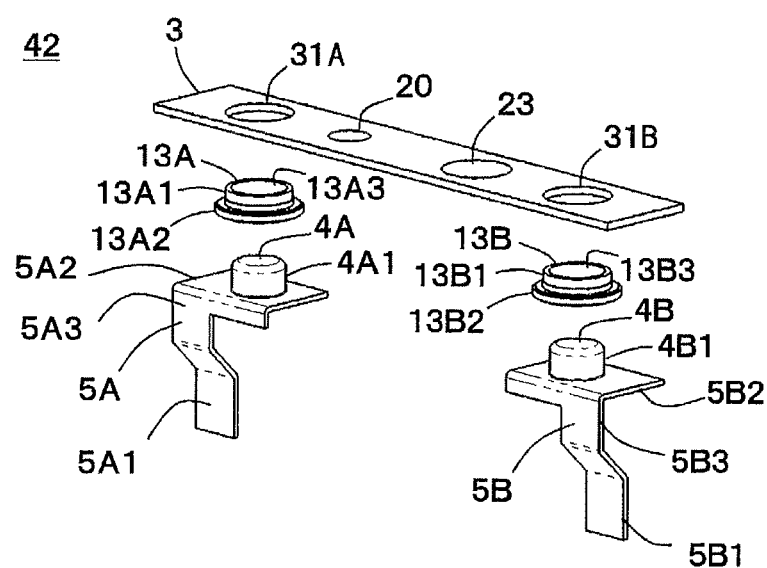
FIG. 4 is an exploded perspective view of a battery cover assembly of the secondary battery according to the first embodiment of the present invention.

FIG. 4 is an exploded perspective view of the battery cover assembly 42. The positive electrode connecting plate 5A having the positive electrode external terminal 4A formed integrally therewith, and the negative electrode connecting plate 5B having the negative electrode external terminal 4B formed integrally therewith are further integrated with the insulating base materials 13A and 13B, respectively, to the battery cover 3 by brazing. The battery cover assembly 42 is thus fabricated. Structures of the battery cover and the positive and negative electrode connecting plates are first described below and then the integrated structure of both is described.

(Battery Cover)

As shown in FIG. 4, the through-holes 31A, 31B through which the positive and negative electrode external terminals 4A, 4B extend are formed on both sides of the battery cover 3 made of an aluminum alloy. Centrally on the battery cover 3 are provided the filling port 20 for supplying the electrolyte, and a pressure release valve 23 for releasing an internal gas from the secondary battery 30 to the outside by rupturing at a predetermined pressure level if the internal pressure of the battery rises to the predetermined level. The cover is thinned down to enhance stress concentration so that if the internal pressure of the battery rises to the predetermined level, the pressure release valve 23 ruptures earlier than the battery casing 1 and other sections of the battery cover 3.

(Positive and Negative Electrode Connecting Plates)

The positive electrode connecting plate 5A is formed from an aluminum alloy, and the negative electrode connecting plate 5B is formed from a copper alloy. As shown in FIG. 4, the positive and negative electrode connecting plates 5A, 5B include weld planar sections 5A1, 5B1 that comes into close contact with the supersonic welds 6F, 6G (see FIG. 1), proximal sections 5A2, 5B2 that extend along a principal plane (broadest surface) of the battery cover 3, and connecting sections (intermediate sections) 5A3, 5B3 that interconnect the proximal sections 5A2, 5B2 and the weld planar sections 5A1, 5B1. The cylindrical positive and negative electrode external terminals 4A, 4B for insertion into the through-holes 31A, 31B are integrally formed at the proximal sections 5A2, 5B2 by deep drawing.

The connecting sections 5A3, 5B3 both include: a wide portion bent from an edge of the proximal section 5A2, 5B2, in a direction parallel to a principal plane of the electricity-generating element group 6, towards the bottom/base of the battery; a narrow planar portion having a width substantially half that of the wide portion and extending from the wide portion, towards the bottom/base of the battery; and a narrow ramp inclined from a lower end of the narrow planar portion, towards the weld planar section 5A1, 5B1.

—Insulating Base Materials—

The battery cover 3 and the positive and negative electrode connecting plates 5A, 5B that have been fabricated beforehand as described above are integrated by electrically insulating both via the insulating base materials 13A, 13B, to fabricate the battery cover assembly 42. The structure of the battery cover assembly 42 is described in further detail below referring to FIGS. 4 and 5.

The insulating base materials 13A and 13B are each fabricated from a sintered alumina ceramic material. Each insulating base material 13A, 13B includes a cylindrical wall 13A1 or 13B1 having an outside diameter smaller than an inside diameter of the corresponding through-hole 31A, 31B, the insulating base material further including a flange 13A2 or 13B2 having an outside diameter greater than the inside diameter of the corresponding through-hole 31A, 31B, and a through-hole 13A3 or 13B3 in a central portion.

The through-hole 13A3, 13B3 in the insulating base material 13A, 13B has an inside diameter greater than an outside diameter of the cylindrical positive or negative electrode external terminal 4A, 4B protruding from the proximal section 5A2, 5B2. In addition, height of the insulating base material 13A, 13B is greater than that of the positive or negative electrode external terminal 4A, 4B protruding from the proximal section 5A2, 5B2.

—Integrated Structure of the Battery Cover Assembly—

The battery cover 3, positive and negative electrode connecting plates 5A, 5B, and insulating base materials 13A, 13B described above are integrated as follows:

In the through-holes 31A, 31B of the battery cover 3, the insulating base materials 13A and 13B are inserted from the secondary battery internal direction of the battery cover 3, and the positive and negative electrode external terminals 4A, 4B extend through through-holes 13A3, 1333 in the insulating base materials 13A and 13B. In other words, the positive and negative electrode external terminals 4A, 4B extend through the through-holes 31A, 31B via the insulating base materials 13A and 13B. Upper edges of the positive and negative electrode external terminals 4A, 4B protrude at a position more distant from the outside of the battery cover 3 than the insulating base materials 13A and 13B.

The positive and negative electrode external terminals 4A, 4B thus inserted with the insulating base materials 13A, 13B arranged outside them are inserted into the through-holes 13A3, 13B3 from the internal direction of the secondary battery, and the insulating base materials 13A, 13B are mechanically integrated by being brazed onto the battery cover 3 and the positive and negative electrode connecting plates 5A, 5B, using the method described below.

Figure 5:
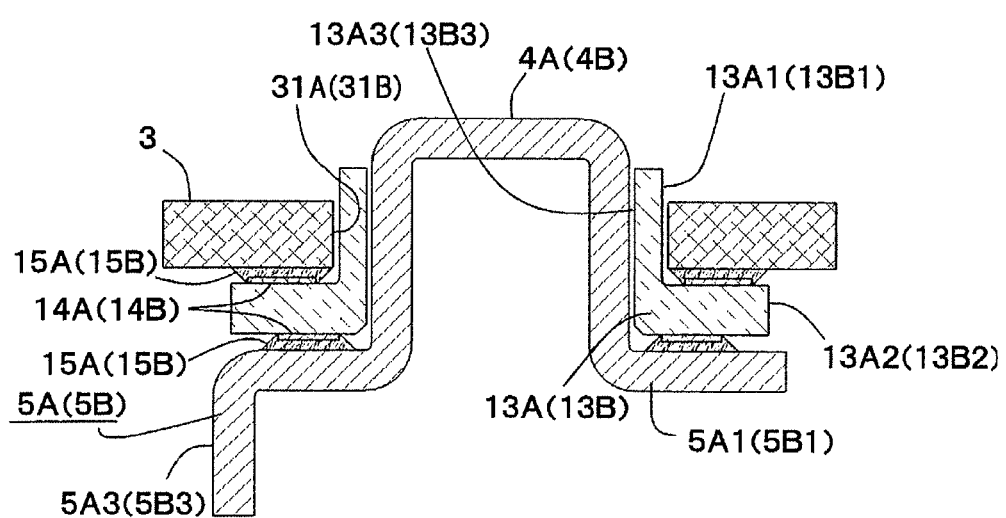
FIG. 5 is a partial sectional view of a terminal and neighboring region in FIG. 2, taken along line A-A.

As shown in FIG. 5, on one section of upper and lower surfaces of the flange 13A2, 13B2 which constitutes part of each insulating base material 13A, 13B, a nickel-metalized layer 14A, 14B is formed in close contact over an entire region of that section. The metalized layer 14A, 14B and the battery cover 3 are mechanically integrated by brazing with brazing materials 15A, 15B composed primarily of aluminum, and the metalized layer 14A, 14B and the positive or negative electrode connecting plate 5A, 5B are also mechanically integrated using the same brazing method.

As described above, the secondary battery according to the first embodiment is constructed so that: the positive and negative electrode connecting plates 5A, 5B are each fabricated from one blank material; the electricity-generating element connection section (weld planar section) 5A1, 5B1 connected to the electricity-generating element group is formed on a first face set at one end of each of the positive and negative electrode connecting plates 5A, 5B; the positive or negative electrode external terminal 4A, 4B is formed on a second face set at the other end of the connecting plate; and the second face of the positive and negative electrode connecting plates 5A, 5B, that is, the positive or negative electrode external terminal 4A, 4B is exposed from the through-hole 31A, 31B. The second face, parallel to the battery cover 3, seals the through-hole 31. Busbars are welded in surface contact onto the second faces of the positive and negative electrode connecting plates 5A, 5B.

—Method of Manufacturing the First Embodiment—

A method of manufacturing the secondary battery 30 of the first embodiment includes: (1) a battery cover assembly fabricating step in which to fabricate the battery cover assembly 42 (see FIGS. 2, 4) by integrating the battery cover 3 and the positive and negative electrode connecting plates 5A, 5B; (2) an electricity-generating element group forming step in which to form the electricity-generating element group 6 (see FIGS. 2, 3) by winding the positive and negative electrode plates 6E, 6D and the separators 6C and shaping up these elements; (3) an electricity-generating element assembly fabricating step in which to fabricate the electricity-generating element assembly 43 (see FIG. 1) by integrating the electricity-generating element group 6 and the battery cover assembly 42; and (4) a sealing step in which to first insert the electricity-generating element assembly 43 into the battery casing 1, then after connecting the battery casing 1 and the battery cover 3, fill the battery with the electrolyte, and seal the filling port 20. The method of manufacturing the secondary battery 30 of the first embodiment is described in detail below in order of the step.

(1) Battery Cover Assembly Fabricating Step

As shown in FIG. 4, a 1.0-2.0 meter thick plate of material formed from an aluminum alloy is drawn into a shape of the positive electrode external terminal 4A and after being blanked into a predetermined profile, the plate material is bent to form the positive electrode connecting plate 5A. Additionally, a plate of material having substantially the same thickness, formed from a copper alloy, is likewise worked to form the negative electrode connecting plate 5B.

Furthermore, another 1.0-2.0 meter thick plate of material formed from an aluminum alloy is press-worked and blanked to form the battery cover 3 including the through-holes, the filling port, the pressure release valve, and the like.

Moreover, a raw powder mixture previously prepared by adding an organic binder to alumina powder and other raw powder is placed in a press die and then press-compressed to form a compact. Next, this compact is sintered in a temperature environment of approximately 1,600° C. to prepare the insulating base materials 13A, 13B. On one section (entire region) of the upper and lower surfaces of the flanges 13A2, 13B2 which constitute part of each insulating base material 13A, 13B, is print-coated with a metal paste to a thickness of about 10 μm, the metal paste being a product obtained by mixing an organic binder and a solvent into molybdenum powder, manganese powder, and more. Next after being dried, the paste-coated section is baked in a humidified forming-gas atmosphere of about 1,400° C. to form the nickel-metalized layer 14A, 14B. A nickel layer for preventing oxidation of the metalized layer 14A, 14B and improving wettability of a brazing material is formed on an upper surface of the nickel-metalized layer 14A, 14B to a thickness of several microns (μm) by electrolytic plating.

As shown in FIG. 5, the insulating base materials 13A, 13B are inserted into the through-holes 31A, 31B of the battery cover 3 and then the positive and negative electrode external terminals 4A, 4B protruding from the proximal sections 5A2, 5B2 of the positive and negative electrode connecting plates 5A, 5B are additionally inserted. At this time, a brazing material composed primarily of aluminum is interposed at interfaces between the positive electrode constituent parts and then brazing is conducted after a predetermined time of exposure to an atmosphere equal to or in excess of a melting point of the brazing material. Likewise, a brazing material composed primarily of copper is interposed at interfaces between the negative electrode constituent parts and brazing is conducted.

Since the brazing materials need to provide brazing connection over the entire surfaces of the flanges 13A2, 13B2 with a view to ensuring airtightness of the battery, use of brazing materials obtained by preforming into a ring shape a wire-like material capable of being easily brought into circular, circumferential, or such contact with a predetermined region is preferable to using a plate-shaped preform. In addition, an aluminum alloy (e.g., A3003) that excels in corrosion resistance and facilitates brazing is desirable for the positive electrode connecting plate 5A and the battery cover 3.

(2) Electricity-Generating Element Group Forming Step

As shown in FIG. 3, the positive electrode plate 6E and the negative electrode plate 6D are wound via the two separators 6C to form a roll of electricity-generating elements. Next after the trailing edge of the wound separators 6C has been taped, the wound stack is flattened out using a jig to obtain a flattened, wound element group. Of the non-coated positive and negative electrode regions 6A, 6B in the flattened, wound element group, only sections to be connected by supersonic welding (see FIG. 1 for these sections) are shaped into a roll form by application of a radial pressure with a jig. After this, the non-coated positive and negative electrode regions 6A, 6B are converged by flattening to form the electricity-generating element group 6.

(3) Electricity-Generating Element Assembly Fabricating Step

The battery cover assembly 42 and the electricity-generating element group 6 are set in place and respective regions to be connected together are positioned. Next, the positive electrode connecting plate 5A and the negative electrode connecting plate 5B are brought into contact with the outermost surface of the non-coated positive electrode section 6A and that of the non-coated positive electrode section 6B, and a pressure is applied to the connecting plates 5A, 5B in that state. In addition, layers of the non-coated positive and negative electrode sections 6A, 6B and the positive and negative electrode connecting plates 5A, 5B are connected together by supersonic vibration to form the electricity-generating element assembly 43 (see FIG. 2).

(4) Sealing Step

As shown in FIG. 1, the electricity-generating element assembly 43 is inserted from the opening of the battery casing 1. At this time, the insulating casing is disposed to internally accommodate the electricity-generating element group 6 and the positive and negative electrode connecting plates 5A, 5B. Next, edges of the battery cover 3 are fitted to the opening 11 in the battery casing 1 and then while a pressure is being applied with a jig so as not to generate clearances at the mating surfaces, the entire mating surfaces between the edges of the battery cover 3 and battery casing 1 are scanned with laser beams to connect the battery casing 1 and the battery cover 3 together for sealing.

Next, the electrolyte is supplied from the filling port 20. In order to impregnate the electrolyte to an inner edge of the electricity-generating element group 6 equally and efficiently, an appropriate measure is adopted to reduce the internal pressure of the battery casing 1 below an outer peripheral pressure of the battery. After filling, the filling port 20 is sealed with the filler plug 22 and then a mating outer circumference of both is laser-welded for airtight sealing, whereby the secondary battery 30 of the present embodiment is assembled (see FIG. 1). Initial charging and various types of inspections follow the assembly step.

(Operational Effects and the Like of the First Embodiment)

In the secondary battery 30 of the present embodiment, the positive and negative electrode connecting plates 5A, 5B having the positive and negative electrode external terminals 4A, 4B integrated therewith are connected to the non-coated positive electrode section 6A and non-coated negative electrode section 6B of the electricity-generating element group, and the positive and negative electrode external terminals 4A, 4B are exposed on the outside of the battery container. In addition, the positive and negative electrode external terminals 4A, 4B and the battery cover 3 are connected together by brazing with the insulating base materials 13A, 13B interposed therebetween. Both of electrical insulation and sealing between the positive and negative electrode external terminals 4A, 4B and the battery cover 3 are thus implemented. This secondary battery provides the following operational effects:

(1) The mechanical integration and electrical connection between the external terminals 4A, 4B and the electricity-generating element group 6 can be executed via the positive and negative electrode connecting plates 5A, 5B fabricated from one independent blank material for the positive electrode and the negative electrode each. This method, compared with conventional ones, reduces the number of parts required.

(2) Steps such as a caulking step for applying a predetermined pressure to gaskets needed in conventional techniques, and holding the pressure, and a caulked-section welding step for establishing electrical connection between electrically continuous parts, are unnecessary, which leads to reduction in the number of assembly steps.

(3) Because of no connection interface between the electrically continuous parts, a flow pathway of current from the electricity-generating element group 6 to the positive and negative electrode external terminals 4A, 4B is shortened, which reduces electrical resistance and thus improves output efficiency of the secondary battery.

(4) The reduction in electrical resistance reduces the amount of heat generated when the current flows from the electricity-generating element group 6 to the positive and negative electrode external terminals 4A, 4B. An event of the heat moving and locally raising a temperature of the electricity-generating element group 6 to partially degrade the electricity-generating element group 6 is therefore suppressed, which extends a life of the secondary battery 30.

(5) The external terminals 4A, 4B are constructed so that the positive and negative electrode connecting plates 5A, 5B, formed from a plate material, have only one of their two principal planes (broadest surfaces) exposed on the outside of the secondary battery 30 in parallel to the principal plane of the battery cover 3. Therefore, compared with the battery fabricated using the conventional method (see Patent Document 1) in which terminals are stretched in a direction perpendicular to a principal plane of a battery cover 3 so that both sides of the above principal plane are exposed in a direction perpendicular to the principal plane of the battery cover 3, the present embodiment reduces extending length of the secondary battery from the battery cover 3 to the outside, hence allowing reduction in dimensions and shape of the battery including the terminals.

(6) Since the positive and negative electrode connecting plates 5A, 5B are each formed from a plate material, connection to the non-coated positive and negative electrode sections 6A, 6B of the electricity-generating element group 6 by supersonic welding is easier than in the conventional method (Patent Document 3).

(7) Since the insulating base materials 13A, 13B are formed from a highly heat-conductive ceramic material, the heat generated when the current is applied to the positive and negative electrode connecting plates 5A, 5B can be effectively released to the battery cover 3 or the battery casing 1 through the insulating base materials 13A, 13B. This suppresses the event that the heat moves and locally raises the temperature of the electricity-generating element group 6 to partially degrade the electricity-generating element group 6, and this suppression effect leads to extending the life of the secondary battery 30.

(8) The insulating base materials 13A, 13B are formed from a highly heat-resistant ceramic material, so this prevents the insulating base materials 13A, 13B from becoming damaged by heat that will be generated when the positive and negative electrode external terminals 4A, 4B and the busbars are connected together by welding, or by a large amount of heat that will occur during rapid charging/recharging or discharge of the secondary battery 30.

(9) The insulating base materials 13A, 13B are formed from a ceramic material of low moisture-permeability. Thus, the moisture contained in outside air will be prevented from permeating the insulating base materials 13A, 13B and entering the secondary battery 30; the electrolyte within the secondary battery 30 escapes to the outside; and thus the degradation of the secondary battery 30 is suppressed.

(10) The insulating base material 13A, unlike the resin-made gasket in the conventional method, is neither fixed while being compressed to a predetermined level, nor therefore, undergoes internally compressive stressing. This causes no stress alleviation (creeping) due to dimensional changes in compression direction with an elapse of time, and maintains a stable airtight sealing effect over an extended period of time.

(11) The positive and negative electrode external terminals 4A, 4B brought into direct electrical contact with the outside are oriented away from those faces (see FIG. 1) of the positive and negative electrode connecting plates 5A, 5B (independent single plate-shaped metallic members) that are connected to the non-coated positive and negative electrode sections 6A, 6B. This reduces the route length required of the positive and negative electrode connecting plates 5A, 5B, and facilitates manufacture, while at the same time, reducing the respective parts in volume as well as in weight.

(12) The brazing materials 15A provide strong connections between the insulating base materials 13A, 13B and the battery cover 3 and between the insulating base materials 13A, 13B and the positive and negative electrode connecting plates 5A, 5B. This prevents an undesirable event, such as separation of the connections, from occurring, even if vibration, temperature changes, or other external force is exerted.

(13) Since the battery cover 3 and the battery casing 1 are connected to each other at the respective outer peripheral regions, a wide space can be provided inside the battery and a volumetric capacity density can be enhanced. In addition, the rectangular shape formed by the battery cover 3 and the battery casing 1 allows both a wide area and excellent heat-dissipation characteristics to be obtained, in comparison with those of cylindrical secondary batteries.

—Battery Module—

The above-constructed secondary battery 30 is commonly used in plurality and the plurality of secondary batteries 30 are mechanically integrated into a battery module prior to mounting on a motor vehicle.

Figure 6:
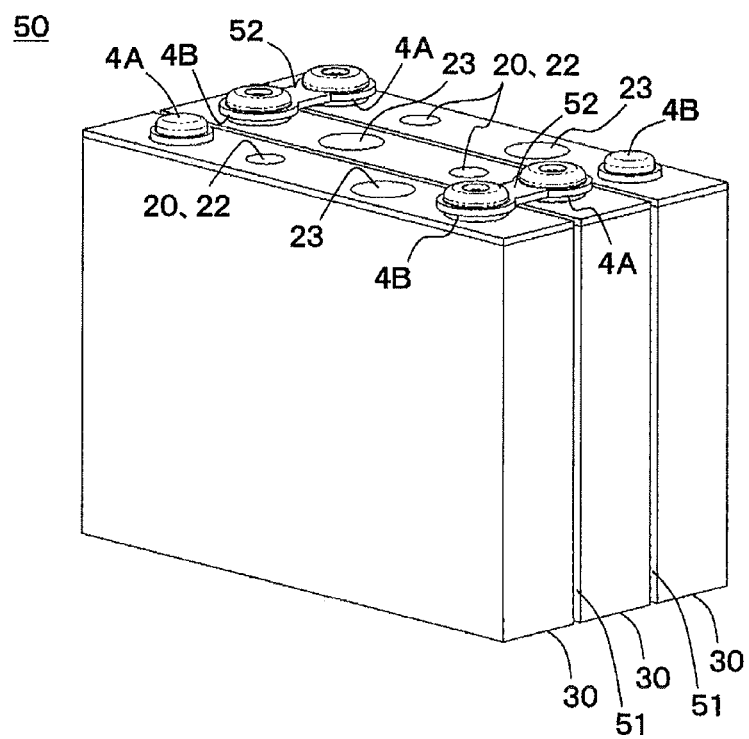
FIG. 6 is a perspective view of an as-moduled state of the secondary battery according to the first embodiment of the present invention.

As shown in FIG. 6, the battery module 50 is constituted by the plurality of secondary batteries 30 arrayed in layers in a thickness direction thereof, with the positive and negative electrode external terminals 4A, 4B of the adjacent secondary batteries 30 mechanically and/or electrically connected via the busbars 52. Orientations of the adjacent secondary batteries 30 are 180° inversed for reversal of the positive or negative polarity between the terminals. Only the secondary battery 30 in the middle of the array shown in the figure is inversed in the layout of the filler plug 22 and pressure release valve 23. The secondary batteries 30 in the battery module 50, therefore, are electrically connected in series in order of the layered arrangement.

Between the adjacent secondary batteries 30, fixed spatial clearances 51 are formed by mechanical means not shown, and air for temperature control of each secondary battery 30 is introduced from an external blower into each spatial clearance 51. Ducting (not shown) that safely conducts a gas from the inside of the battery to the outside is connected to the pressure release valve 23 of each secondary battery 30.

Figure 7:
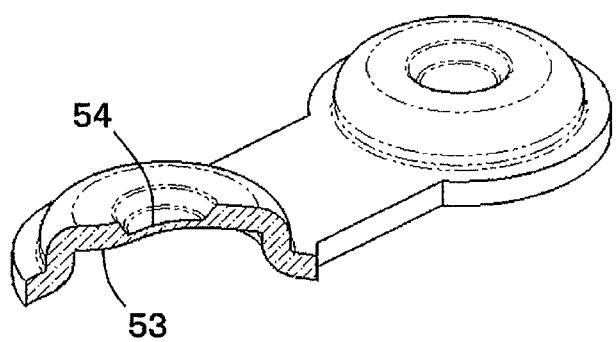
FIG. 7 is a partial sectional view of a busbar used to module the secondary battery according to the first embodiment of the present invention.

As shown in FIG. 7, each busbar 52 is formed from a plate material made of a metal, that is in the present example, an aluminum alloy. In that position of the busbar 52 which corresponds to the positive or negative electrode external terminal 4A, 4B of an adjacent secondary battery 30, a recess 53 for accommodating a front end (upper end) of the positive or negative electrode external terminal 4A, 4B is provided in a downward orientation and the recess 53 partially has a substantially spherical inner surface. Centrally on a reverse side (upper surface) of the recess 53 is formed a circular recess, the recess of which forms a thin-walled portion 54. The recess 53 and the thin-walled portion 54 are formed by drawing and press-working.

Figure 8:
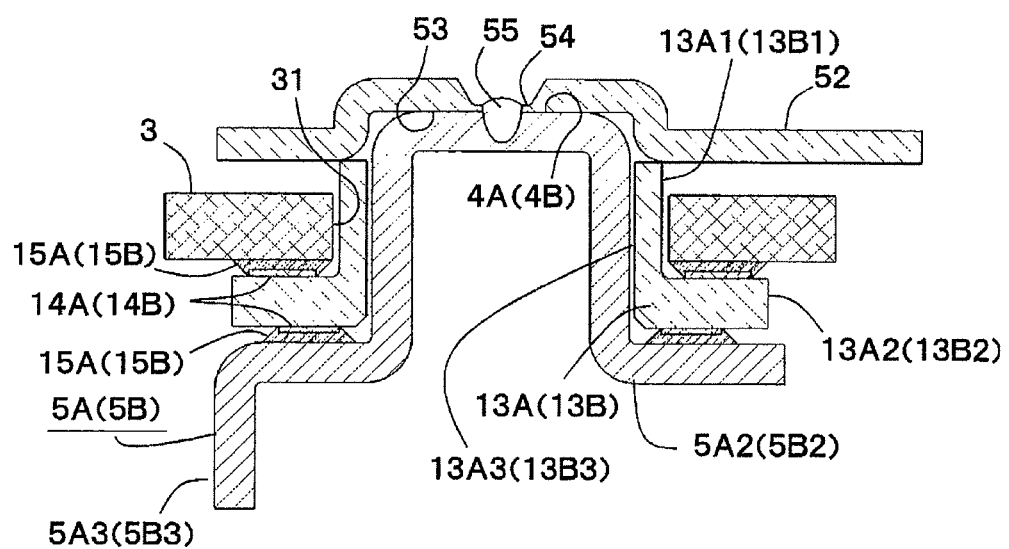
FIG. 8 is a partial sectional view of the secondary battery terminal region with a busbar welded onto a terminal in the first embodiment of the present invention.

As shown in FIG. 8, the busbar 52, after having its recess 53 positioned over the front end (upper end) of the outer exposed surface of the positive or negative electrode external terminal 4A, 4B, is welded onto the positive or negative electrode external terminal 4A, 4B, at the thin-walled portion 54. Reference number 55 denotes the weld 55. The recess 53 has an inside diameter slightly greater than an outside diameter of the positive or negative electrode external terminal 4A, 4B, and in an unwelded state of the busbar 52, when the recess 53 is applied over the positive or negative electrode external terminal 4A, 4B, both contact surfaces between the recess 53 and the external terminal 4A, 4B slidingly move and are self-aligned into appropriate relative positions, even if slight shifts in relative position exist. The self-alignment of the contact surfaces reliably brings the recess 53 into appropriate contact with the external terminal 4A, 4B.

This secondary battery module provides the following operational effects:

(1) Since the outward protruding upper end of the positive or negative electrode external terminal 4A, 4B and the inner surface of the busbar recess 53 nearly match in shape, the self-alignment enables easy (automatic) positioning of both.

(2) Inadvertent short-circuiting between the battery cover 3 and the positive electrode external terminal 4A or the negative electrode external terminal 4B during the positioning of the busbar 52 can be prevented since the upper end face of the insulating base material 13A, 13B is above the battery cover 3.

Mounting the terminals on the battery cover requires ensuring electrical insulation between both, and the airtightness between spatial clearances. In order to meet these requirements, there exist the known secondary batteries described in Patent Documents 2 to 4 (listed below).

(1) In the secondary battery of Patent Document 2, a resin-made gasket is interposed between the terminal region and the battery cover and these elements are both compressed and held under a predetermined pressure so as to perform an airtight sealing function. Internal compressive stresses upon the resin-made gasket, however, are likely to cause stress alleviation (creeping) due to dimensional changes in compression direction with the elapse of time, and hence to lead to degraded airtight sealing effect.

In addition, a large number of parts are needed in the structure that involves connecting the terminals of a plurality of batteries to each other as well as connecting the terminals from a current-collector region of the electricity-generating element group. Furthermore, part assembly requires many steps, which include a step for preassembling parts, a caulking step for applying a predetermined pressure to the gasket and holding the pressure, a caulked-section welding step for establishing electrical connection between electrically continuous parts, and so on.

(2) In the secondary battery of Patent Document 3, through-terminal members of a battery cover that extend through the inside and outside of the battery are integrally formed by plastic deformation of the current-collector members extending from the electricity-generating element group, and then connected to the terminals existing outside the battery. The integrally formed structure from the current-collector members to the through-terminal members enables the number of parts to be reduced below that used in the secondary battery of Patent Document 2. The above-mentioned assembly steps including the preassembly step, caulking step, and caulked-section welding step, however, are substantially irreducible.

(3) In the secondary battery of Patent Document 4, the inner circumferential surfaces of the can-shaped, ceramic-made insulating base materials disposed at the through-holes of the battery cover are brazed with the bar-shaped terminals, and the outer circumferential surfaces of the insulating base materials are brazed with the battery cover. The bar shape of the terminals, however, makes it difficult to previously integrate into one part the respective connections with the electricity-generating element group which needs to be shaped like a flat plate, and this difficulty might lead to the number of parts being pluralized and increasing and to the integration of these parts also being needed.

Patent Document 2: JP-2010-97764-A
Patent Document 3: JP-2009-277604-A
Patent Document 4: Japanese Patent No. 3659477

As described above, the secondary battery according to the first embodiment solves the foregoing problems associated with the conventional techniques.

Second Embodiment

A second embodiment in which the present invention is applied to a rectangular lithium-ion secondary battery for driving a motor vehicle is described below referring to the accompanying drawings. In the present embodiment and subsequent embodiments, the same members as in the first embodiment are each assigned the same reference number or symbol. The following description focuses upon differences.

Configuration of the Second Embodiment

Figure 9:
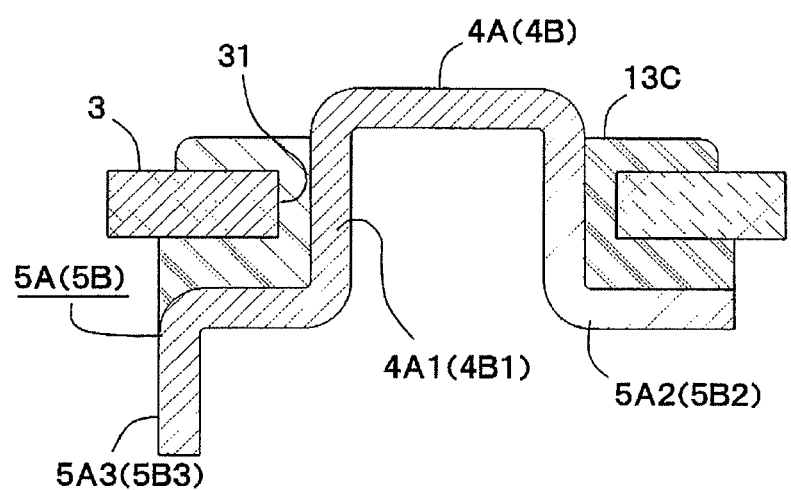
FIG. 9 is a partial sectional view showing a terminal and neighboring region of a secondary battery according to a second embodiment of the present invention.

As shown in FIG. 9, the secondary battery 30 includes substantially the same battery cover 3 and positive and negative electrode connecting plates 5A, 5B as those used in the first embodiment, and the positive and negative electrode external terminals 4A, 4B extend through the through-holes 31 in the battery cover 3 via an insulating base material 13C.

The insulating base material 13C, formed from a resin material that has insulating properties, is in close contact with an entire edge surface of each through-hole 31 and with entire wall surfaces 4A1, 4B1 of the positive and negative electrode external terminals 4A, 4B at the positive and negative electrode connecting plates 5A, 5B. In order to ensure closer contact with the insulating base material 13C, the battery cover 3 and the positive and negative electrode connecting plates 5A, 5B have their surfaces roughed before by being formed with fine projections and depressions on the surface.

In order to avoid electrical contact between the battery cover 3 and the positive and negative electrode connecting plates 5A, 5B and to prevent liquid leakage of an electrolyte accommodated in the secondary battery 30, the insulating base material 13C shrouds upper and lower end faces of each through-hole 31 in the battery cover 3, the insulating base material 13C further being placed in spatial clearances defined by the battery cover 3 and the positive and negative electrode external terminals 4A, 4B. The clearances are thus enclosed with the insulating base material 13C. The insulating base material 13C are placed in the clearances by injection molding; details will be described later in a statement hereof concerning a battery cover assembly fabricating step.

A resin that has insulating properties, such as polyphenylene sulfide (PPS), polybutylene terephthalate (PBT), or perfluoroalkoxyfluorine (PFA), can be used as/in the insulating base material 13C.

Method of Manufacturing the Second Embodiment

The manufacturing process for the secondary battery of the second embodiment includes: (1) a roughening step in which to roughen the surfaces of the battery cover 3, the positive and negative electrode connecting plates 5A, 5B, and the positive and negative electrode external terminals 4A, 4B formed on the battery cover 3 and the connecting plates 5A, 5B; (2) a battery cover assembly fabricating step in which to fabricate the battery cover assembly 42 by integrating the battery cover 3 and the positive and negative electrode connecting plates 5A, 5B; (3) an electricity-generating element group forming step in which to form the electricity-generating element group 6 by winding the positive and negative electrode plates 6E, 6D and the separators 6C and shaping up these elements; (4) an electricity-generating element assembly fabricating step in which to fabricate the electricity-generating element assembly 43 by connecting the electricity-generating element group 6 and the battery cover assembly 42; and (5) a sealing step in which to first insert the electricity-generating element assembly 43 into the battery casing 1, then after connecting the battery casing 1 and the battery cover 3, fill the battery with the electrolyte, and seal the filling port 20. The method of manufacturing the secondary battery 30 of the present embodiment is described in detail below in order of the step.

(1) Roughening Step

After removal of oils from the positive electrode connecting plate 5A and the battery cover 3, both formed from an aluminum alloy, by immersion in a deoiling oven as a pretreatment, the connecting plate 5A and the battery cover 3 are immersed in an acid solution and acid components are adsorbed onto its surface layer. Next, the connecting plate 5A and the battery cover 3 are immersed in a basic solution for alkaline etching, thereby to separate residual fats and taints, along with the surface of the aluminum alloy, from the surfaces of the connecting plate 5A and the battery cover 3, and after washing in water, the connecting plate 5A and the battery cover 3 are dried. Next after a predetermined time of immersion treatment of these pretreated members in a temperature-controlled pH9-10 aqueous solution that contains hydrazine, ammonia, a water-soluble amine compound, and the like, the members are washed in water and dried. Through these treatments, the surfaces of the positive electrode connecting plate 5A and the battery cover 3 are roughened, that is, covered with a myriad of fine dents and dimples of 20 to 80 nm in average diameter.

On the other hand, after removal of oils from the negative electrode connecting plate 5B, formed from a copper alloy, by substantially the same pretreatment as that used for the aluminum alloy, the connecting plate 5B is immersion-treated in an aqueous solution that contains hydrogen peroxide and sulfuric acid, thereby to selectively dissolve a grain boundary of the surface and obtain a surface having roughness levels of at least 0.5 µm at periods of one to several tens of microns (µm). This is followed by surface hardening, in which the negative electrode connecting plate 5B is immersed in an aqueous solution that contains caustic soda and sodium chlorite. Copper atoms are then oxidized and a cupric oxide layer insoluble in basic solutions is formed on the surface. This results in the surface being roughened, that is, covered with a myriad of fine dents and dimples of 10 to 200 nm in average diameter.

The above surface roughening of the metallic materials enables dense entry of the resin-made insulating base material 13C into the fine dents and dimples of the positive and negative electrode connecting plates 5A, 5B and the battery cover 3, and hence, enhancement of connecting strength and airtightness.

(2) Battery Cover Assembly Fabricating Step

The positive electrode connecting plate 5A and the negative electrode connecting plate 5B are inserted into the through-holes 31 formed on the battery cover 3, and then after being positioned at predetermined relative spatial intervals, both connecting plates are fixed to a die. Next after heating of the die to 100 to 200° C., the clearances between the positive and negative electrode connecting plates 5A, 5B and the battery cover 3 are filled in with the resin, such as PPS, under pressure for injection molding, to form the insulating base material 13C. During injection molding, it is necessary to prevent the positive and negative electrode connecting plates 5A, 5B, formed from the aluminum alloy or the copper alloy, and the positive and negative electrode external terminals 4A, 4B from suffering thermal oxidation due to exposure to the high temperature, and leading to formation of an oxide film, discoloration, and other unwanted events. Periphery (at least the inside of the die), therefore, is preferably placed in an inert gas atmosphere of nitrogen, argon, or the like. The injection-molded insulating base material 13C, after being cooled and solidified, is mechanically integrated with the positive and negative electrode connecting plates 5A, 5B and the battery cover 3, whereby the battery cover assembly 42 is formed.

(3) Electricity-Generating Element Group Forming Step

The electricity-generating element group forming step is substantially the same as in the first embodiment, and description is therefore omitted herein.

(4) Electricity-Generating Element Assembly Fabricating Step

The electricity-generating element assembly fabricating step is substantially the same as in the first embodiment, and description is therefore omitted herein.

(5) Sealing Step

The sealing step is substantially the same as in the first embodiment, and description is therefore omitted herein.

Operational Effects and the Like of the Second Embodiment

In the secondary battery of the present embodiment, similarly to the first embodiment, the positive and negative electrode regions are both constructed so that the region from the weld planar section 5A1, 5B1, which is the connection with the non-coated positive or negative electrode section 6A, 6B, to the positive or negative electrode external terminal 4A, 4B, is constructed from the positive or negative electrode connecting plate 5A, 5B, a single part. Additionally, the busbar connection surface of the positive or negative electrode external terminal 4A, 4B extends in parallel to one face of the battery container and is exposed from a through-hole. The secondary battery, therefore, yields substantially the same advantageous effects as those of the first embodiment, and in particular, provides the following operational effects:

(1) Since the insulating base material 13C is injection-molded in firm contact with the surface-roughened battery cover 3 and positive and negative electrode connecting plates 5A, 5B, a connection boundary with fine projections and depressions is formed, which in turn produces an anchor effect and maintains high connecting strength.

(2) The insulating base material 13C is formed from a resin and has definite ductility, which prevents occurrence of brittle fracture due to physical shocks, compared with such a ceramic material as used in the first embodiment.

(3) Since the insulating base material 13C is formed from a resin, part costs are reduced relative to those incurred for such a ceramic material as used in the first embodiment.

Third Embodiment

Next, a third embodiment in which the present invention is applied to a rectangular lithium-ion secondary battery for driving a motor vehicle is described below referring to the accompanying drawings. Changes to the shapes of the positive and negative electrode external terminals and busbars in the first embodiment are incorporated in the third embodiment. The following description focuses upon the differences.

Figure 10:
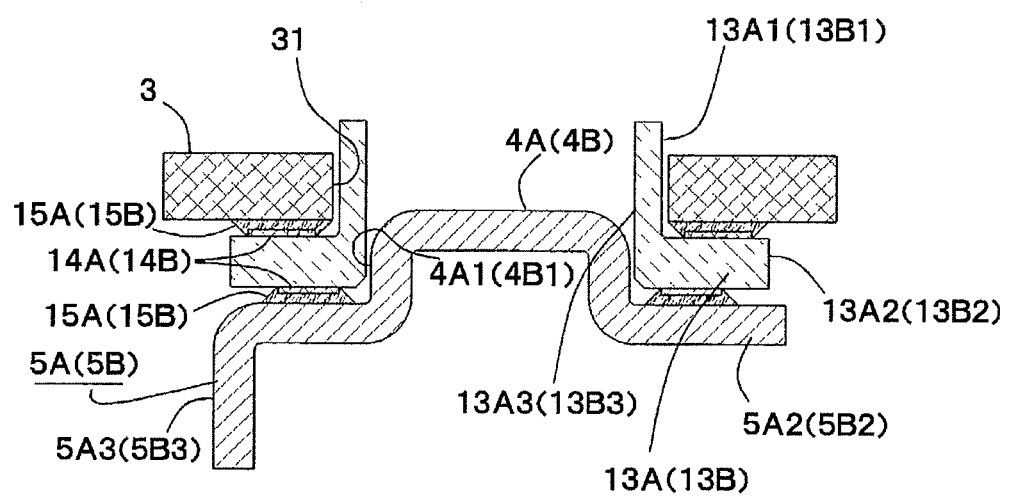
FIG. 10 is a partial sectional view showing a terminal and neighboring region of a secondary battery according to a third embodiment of the present invention.

As shown in FIG. 10, the positive connecting plates 5A, 5B include substantially the same weld planar sections 5A1, 5B1 (not shown), proximal sections 5A2, 5B2, and intermediate sections 5A3, 5B3, as those used in the first embodiment, the proximal sections 5A2, 5B2 being formed with cylindrical positive and negative electrode external terminals 4A, 4B, respectively, that are smaller in height than those of the first embodiment. In other words, the positive and negative electrode external terminals each have an upper surface lying below that of the cover 3 and positioned at depths in a through-hole 31.

The battery cover 3 is pierced with substantially the same through-holes 31 as provided in the first embodiment, and in the holes 31, substantially the same insulating base materials 13A, 13B are inserted and fixed. The positive and negative external terminals 4A and 4B are inserted into through-holes 13A3, 13B3 of the insulating base materials 13A, 13B, from an internal direction of the secondary battery, and the insulating base materials 13A, 13B are mechanically integrated by being brazed onto the battery cover 3 and the positive and negative electrode connecting plates 5A, 5B. This integrated structure is substantially the same as in the first embodiment, except that the height of the positive and negative external terminals 4A and 4B is smaller than length of the through-holes 13A3, 13B3 and that front ends, or upper surfaces serving as the busbar connection surfaces, of the positive and negative external terminals 4A and 4B are present inside the through-holes 13A3, 13B3.

Figure 11:
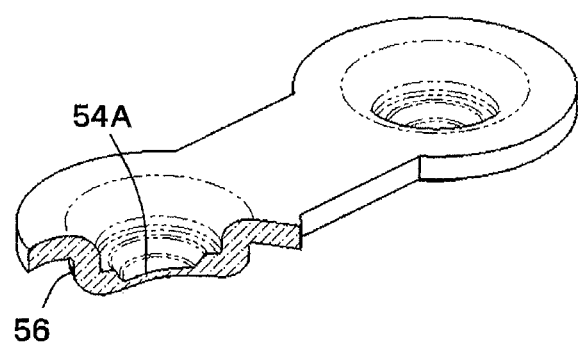
FIG. 11 is a partial sectional view of a busbar used to module the secondary battery according to the third embodiment of the present invention.

As shown in FIG. 11, the busbar 52A used to module batteries is formed from a metal, that is in the present example, an aluminum alloy. In that position of the busbar 52A which corresponds to the positive or negative electrode external terminal 4A, 4B to which the busbar is to be connected, a bump 56 formed to fit into the through-hole 13A3, 13B3 is provided in a downward orientation. Centrally on a reverse side (upper surface) of the bump 56 is formed a circular recess, the recess of which forms a thin-walled portion 54A. The bump 56 and the thin-walled portion 54A are formed by drawing and press-working.

Figure 12:
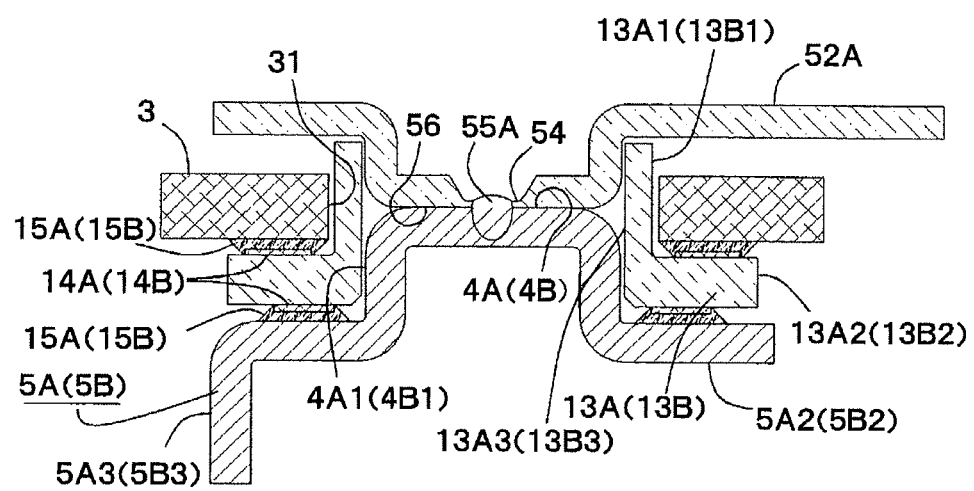
FIG. 12 is a partial sectional view of the secondary battery terminal region with a busbar welded onto a terminal in the third embodiment of the present invention.

As shown in FIG. 12, the busbar 52A is welded onto the positive or negative electrode external terminal 4A, 4B, with the bump 56 positioned inside the through-hole 13A3. Reference number 55A denotes the weld.

Operational Effects of the Third Embodiment

The secondary battery of the present embodiment yields substantially the same advantageous effects as those of the first embodiment, and in particular, provides the following operational effects:

(1) While being exposed at the surface of the secondary battery to ensure connectivity to the busbar 52A through the through-hole 31 in the battery cover 3, the positive or negative electrode external terminal 4A, 4B is positioned internally to the outermost surfaces of the battery cover 3 and the insulating base material 13A, 13B. This allows the positive or negative external terminal 4A, 4B to avoid unnecessary contact with the outside, and protects the positive or negative external terminal surface. Occurrence of electrical shock, short-circuiting, and the like can also be prevented.

(2) The front end (upper end) of the insulating base material 13A, 13B is present at a position higher than an outer surface (upper surface) of the battery cover 3, this layout preventing the busbar 52A from coming into direct contact with the battery cover to cause short-circuiting.

(3) Since the height of the positive or negative electrode external terminal 4A, 4B, that is, the amount of drawing thereof can be reduced relative to that required in the first embodiment, a manufacturing cost of the positive or negative electrode external terminal 4A, 4B can be saved.

Fourth Embodiment

A fourth embodiment in which the present invention is applied to a rectangular lithium-ion secondary battery for driving a motor vehicle is described below referring to the accompanying drawings. Changes to the shapes of the positive and negative electrode external terminals and busbars in the first embodiment are incorporated in the fourth embodiment.

Figure 13:
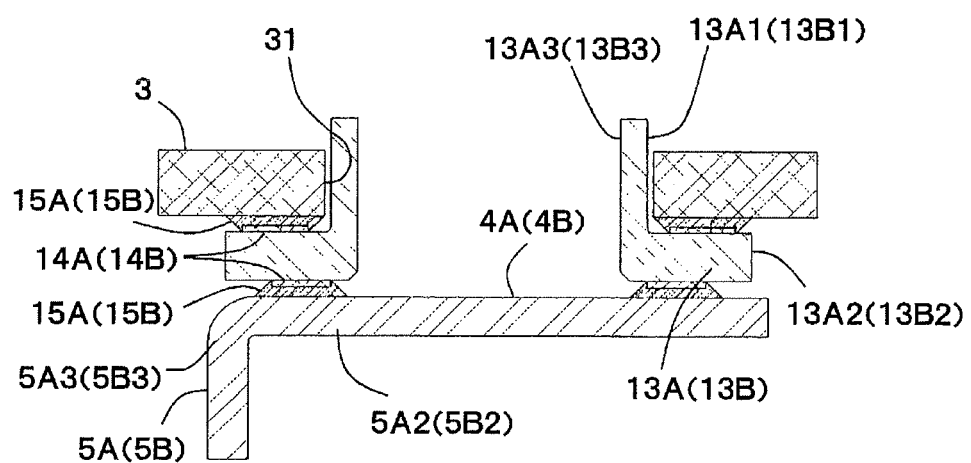
FIG. 13 is a partial sectional view showing a terminal and neighboring region of a secondary battery according to a fourth embodiment of the present invention.

As shown in FIG. 13, the positive and negative electrode connecting plates 5A, 5B have their proximal sections 5A2, 5B2 formed into a planar shape parallel to the principal plane of the battery cover 3, and the positive and negative electrode external terminals 4A, 4B serve as part of the proximal sections 5A2, 5B2. That is to say, unlike the cylindrical positive and negative electrode external terminals in each of the first to third embodiments, the positive and negative electrode external terminals 4A, 4B have a planar shape.

Figure 14:
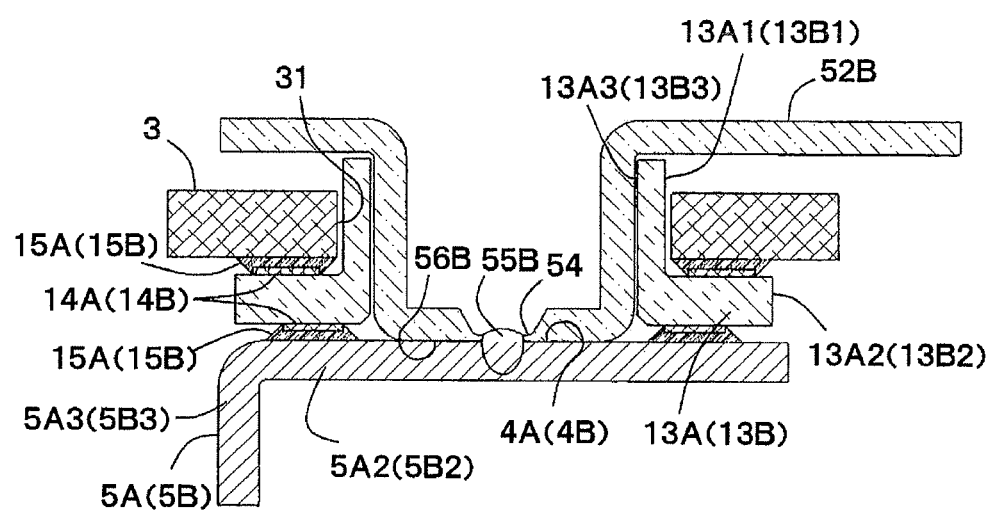
FIG. 14 is a partial sectional view of the secondary battery terminal region with a busbar welded onto a terminal in the fourth embodiment of the present invention.

As shown in FIG. 14, the busbar 52B is formed so that similarly to the busbar 52A in the third embodiment, a bump 56B formed to fit into the through-hole 13A3, 13B3 is provided in a downward orientation in the position of the busbar 52B that corresponds to the positive or negative electrode external terminal 4A, 4B to which the busbar is to be connected. A thin-walled portion 54 is formed centrally on a reverse side (upper surface) of the bump 56. The busbar 52B is welded onto the positive or negative electrode external terminal 4A, 4B, with the bump 56B positioned inside the through-hole 13A3. Reference number 55B denotes the weld.

The secondary battery according to the fourth embodiment is constructed so that the region that becomes the external terminal, in other words, the busbar weld surface is a region that, of the plane of the proximal section 5A2, 5B2 of the positive or negative electrode current-collector plate 5A, 5B, faces the through-hole 31 in the battery cover 3, the particular region merely being exposed without extending through the through-hole 31. The insulating base material 13A, 13B extends through the through-hole 31. The busbar connecting to the external terminal 4A, 4B is accommodated in the through-hole 31, more strictly, the through-hole 13A3, 13B3 of the insulating base material 13A, 13B, from the principal plane of the battery cover 3, and then welded with the external terminal 4A, 4B. In this way, the insulating base material 13A, 13B is not only used to insulate the external terminal 4A, 4B, but also functions to prevent the busbar from coming into contact with the battery cover 3, especially an inner surface of the through-hole 31, and becoming short-circuited. In addition, the external terminal 4A, 4B is constructed to seal the through-hole 31.

Operational Effects of the Fourth Embodiment

The secondary battery of the present embodiment yields the following operational effects:

(1) As in the first embodiment, while being exposed at the surface of the secondary battery to ensure connectivity to the busbar 52B through the through-hole 31 in the battery cover 3, the positive or negative electrode external terminal 4A, 4B is positioned internally to the outermost surfaces of the battery cover 3 and the insulating base material 13A. This allows the positive or negative external terminal 4A, 4B to avoid unnecessary direct contact with the outside, and protects the front surface (upper end face) of the positive or negative external terminal 4A, 4B. Occurrence of electrical shock, short-circuiting, and the like can also be prevented.

(2) As in the first embodiment, the upper end of the insulating base material 13A is present at a position higher than an outer surface (upper surface) of the battery cover 3, this layout preventing the busbar 52B from coming into direct contact with the battery cover 3 to cause short-circuiting.

(3) The positive or negative electrode external terminal 4A, 4B does not require drawing, so a manufacturing cost of the positive or negative electrode external terminal 4A, 4B can be reduced relative to the external terminal manufacturing cost required in the first embodiment.

Fifth Embodiment

Next, a fifth embodiment in which the present invention is applied to a rectangular lithium-ion secondary battery for driving a motor vehicle is described below referring to the accompanying drawings. Changes to the shapes of the positive and negative electrode external terminals and busbars in the first embodiment are incorporated in the fifth embodiment.

Figure 15:
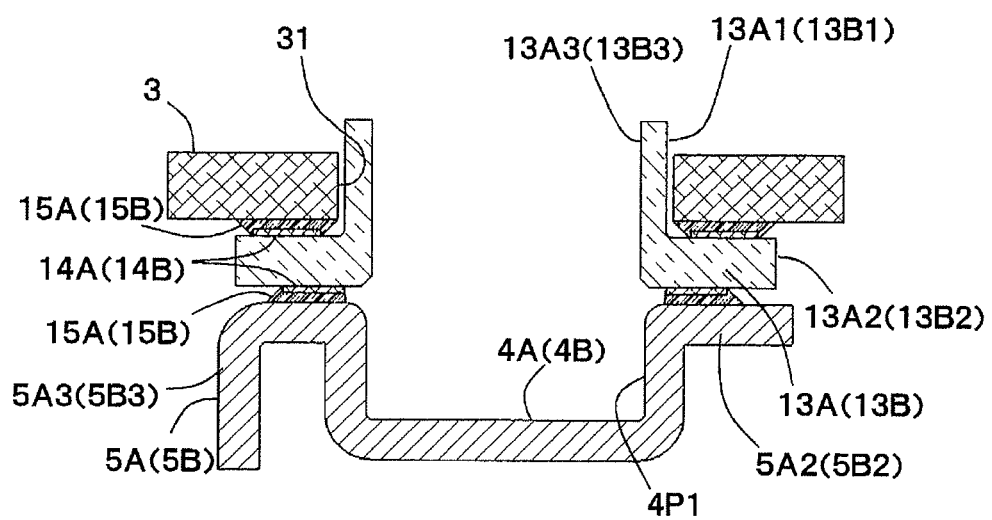
FIG. 15 is a partial sectional view showing a terminal and neighboring region of a secondary battery according to a fifth embodiment of the present invention.

As shown in FIG. 15, at the proximal sections 5A2, 5B2 of the positive and negative electrode connecting plates 5A, 5B, positive and negative electrode external terminals 4A, 4B are formed as recesses continuous with the through-holes 13A3, 13B3. That is to say, unlike the upward concave positive and negative electrode external terminals inserted in the through-holes 13A3, 13B3 of the first to third embodiments, the positive and negative electrode external terminals 4A, 4B are the recesses concaved below the through-holes 31 and 13A3, 13B3.

Figure 16:
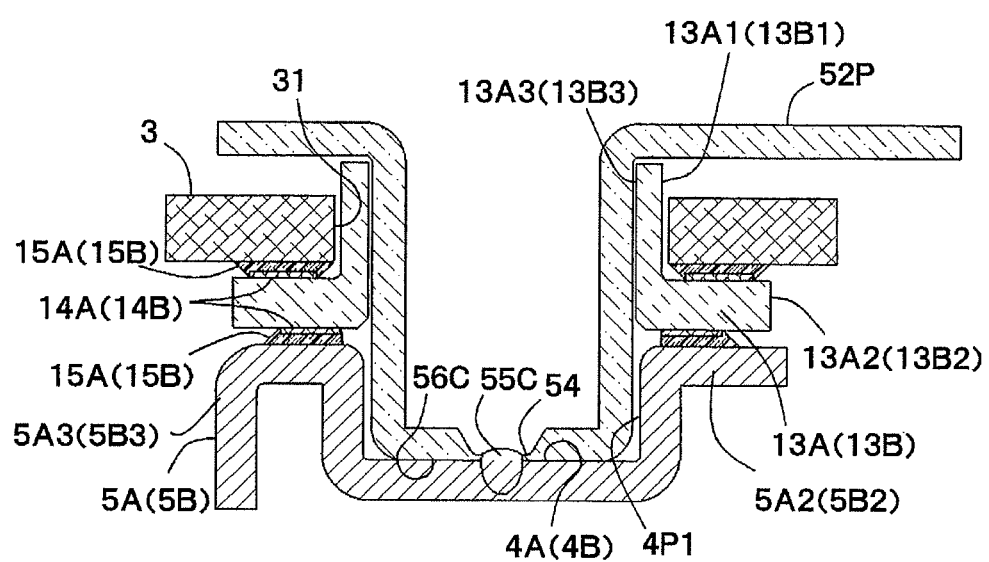
FIG. 16 is a partial sectional view of the secondary battery terminal region with a busbar welded onto a terminal in the fifth embodiment of the present invention.

As shown in FIG. 16, a busbar 52P is formed so that similarly to the busbars in the third and fourth embodiments, a bump 56C formed to fit into the through-hole 13A3, 13B3 is provided in a downward orientation in the position of the busbar 52P that corresponds to the positive or negative electrode external terminal 4A, 4B to which the busbar is to be connected. Centrally on a reverse side (upper surface) of the bump 56C is formed a circular recess, the recess of which forms a thin-walled portion 54. The busbar 52P is welded onto the positive or negative electrode external terminal 4A, 4B, with the bump 56C positioned inside the through-hole 13A3, 13B3. Reference number 55C denotes the weld.

The reverse side (upper surface) of the bump 56C is a hollow section that reaches internal depths of the secondary battery 30, and this hollow section can be used as a space for placing a thermistor, thermocouple, and/or other temperature sensors to measure an internal temperature of the secondary battery 30, and/or for inserting and/or mounting other parts. A temperature sensor, for example, will be bonded onto the busbar 52P and then inserted into a neighborhood of the weld 55C through the hollow section in the busbar 52P.

Operational Effects of the Fifth Embodiment

In the secondary battery of the present embodiment, as in that of the third embodiment, while being exposed at the surface of the secondary battery to ensure connectivity to the busbar 52P through the through-hole 31 in the battery cover 3 and the through-hole 13A3, 13B3 in the insulating base material 13A, 13B, the positive or negative electrode external terminal 4A, 4B is positioned internally to the outermost surfaces of the battery cover 3 and the insulating base material 13A, 13B. The secondary battery of the present embodiment, therefore, yields the following operational effects:

(1) Unnecessary direct contact with the outside can be avoided and the positive and negative external terminal surfaces can be protected. Occurrence of electrical shock, short-circuiting, and the like can also be prevented.

(2) As in the first embodiment, the upper end of the insulating base material 13A, 13B is present at a position higher than an outer surface (upper surface) of the battery cover 3, this layout preventing the busbar 52P from coming into direct contact with the battery cover to cause short-circuiting.

(3) Since the hollow section is a space allowing a front end of a temperature sensor to access the inside of the secondary battery, the temperature of the battery can be measured and monitored with high sensitivity and high accuracy, compared with a case in which the temperature sensor is mounted, for example, on the surface of the battery casing or battery cover 3.

Sixth Embodiment

A sixth embodiment in which the present invention is applied to a rectangular lithium-ion secondary battery for driving a motor vehicle is described below referring to the accompanying drawings. An improvement in reliability of the brazing materials layer in the first embodiment, as well as changes to the shapes of the battery cover and positive and negative electrode external terminals in the first embodiment are incorporated in the sixth embodiment.

Figure 17:
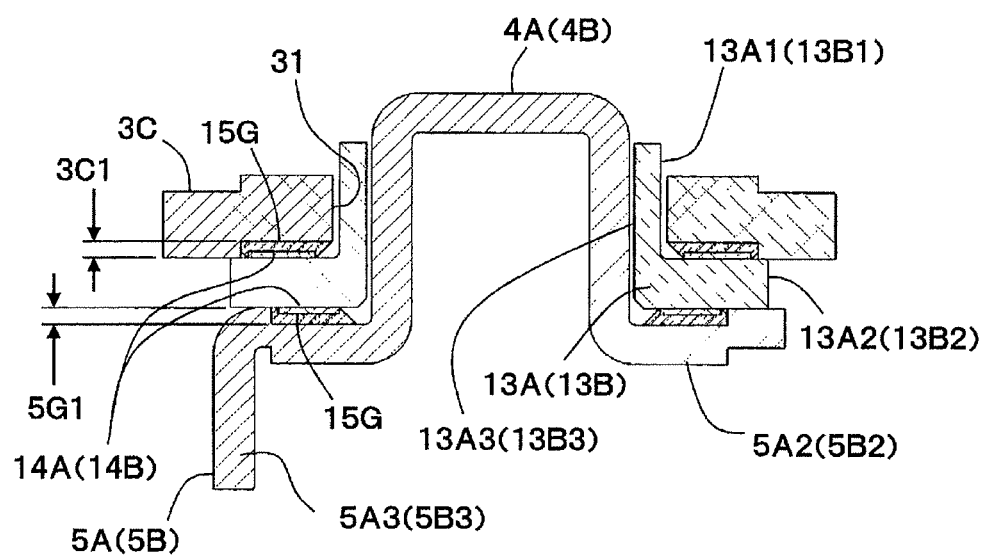
FIG. 17 is a partial sectional view showing a terminal and neighboring region of a secondary battery according to a sixth embodiment of the present invention.

As shown in FIG. 17, a recessed region is provided in the inner surface region of the battery cover 3 that lies near through-hole periphery. This recessed region is concaved away from the metalized layer 14A, 14B provided on the flange upper surface of the insulating base material 13A, 13B. Reference number 3C1 denotes a difference in a vertical level of the recessed region, and height of the level difference can be set to range between 10 and 50 μm inclusive. In the recessed region, the metalized layer 14A, 14B of the insulating base material 13A, 13B and the battery cover 3 are brazed together via a brazing material 15G.

Similarly to the above, on the surfaces of the proximal sections 5A2, 5B2 of the positive electrode connecting plates 5A, 5B, a recessed region shown as a difference in vertical level, 5G1, is provided in a proximal section peripheral region of the cylindrical external terminal 4A, 4B. This recessed region is concaved away from the metalized layer 14A, 14B provided on the flange lower surface of the insulating base material 13A, 13B. Reference number 5G1 denotes the difference in the vertical level of the recessed region. In the recessed region, the metalized layer 14A, 14B of the insulating base material 13A, 13B is brazed along with the positive or negative electrode connecting plate 5A, 5B.

Substantially the same structure as that described above is adopted at the negative electrode side.

Stepped portions equivalent to the level differences 3C1, 5G1 are both formed by half-piercing that applies a vertical shearing load locally to the battery cover 3 or positive electrode connecting plate 5A, 5B that is a base material. The insulating base material 13A, 13B and the battery cover 3 are in direct contact with each other on both faces of the outermost circumferential section of the insulating base material 13A, 13B. The same also applies to contact between the insulating base material 13A, 13B and the positive electrode connecting plate 5A, 5B. Clearances equivalent to the stepped portions 3C1, 5G1 are filled in with the brazing material 15G.

Operational Effects of the Sixth Embodiment

In the secondary battery of the present embodiment, total layer thickness of both brazing materials 15G is automatically equated with a total value of the level differences 3C1, 5G1, and this facilitates layer thickness management of the brazing materials. At the same time, mechanical strength of the brazing materials layers and barrier properties of the electrolyte and moisture, and other performance characteristics relating to reliability can always be maintained at a constant level.

Seventh Embodiment

A seventh embodiment in which the present invention is applied to a rectangular lithium-ion secondary battery for driving a motor vehicle is described below referring to the accompanying drawings. An improvement in reliability of the brazing materials layer in the first embodiment, as well as changes to the shapes of the connections between the positive and negative electrode external terminals, insulating base materials, and battery cover in the first embodiment, are incorporated in the seventh embodiment.

Figure 18:
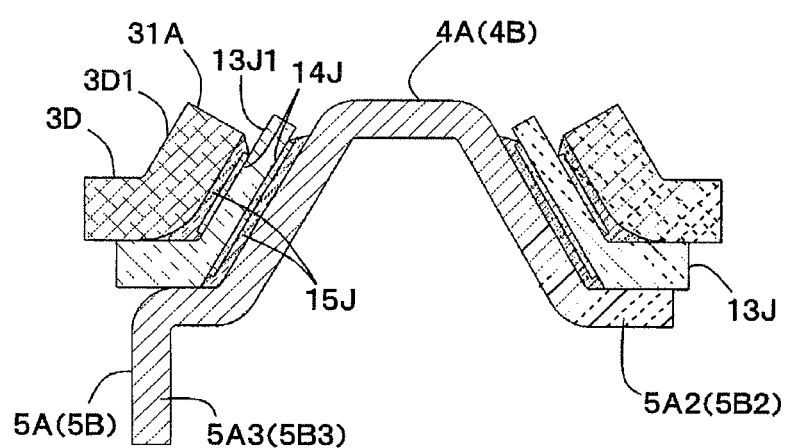
FIG. 18 is a partial sectional view showing a terminal and neighboring region of a secondary battery according to a seventh embodiment of the present invention.

As shown in FIG. 18, the positive electrode connecting plates 5A, 5B in the present embodiment include substantially the same weld planar sections (not shown), proximal sections 5A2, 5B2, and intermediate sections 5A3, 5B3, as those used in the first embodiment. The proximal sections 5A2, 5B2, unlike those of the first embodiment, is formed with upward-tapered can-type positive and negative electrode external terminals 4A, 4B shaped like a circular truncated cone.

A bulge 3D1 having an inner peripheral surface on which is formed a tapered surface positioned along a side face of each positive or negative electrode external terminal 4A, 4B is formed in a peripheral region of a through-hole 31A of a battery cover 3D. On each of insulating base materials 13J, a bulge 13J1 with inner and outer peripheral surfaces positioned along the tapered inner peripheral surface of the bulge 3D1 in addition to the side face of the positive or negative electrode external terminal 4A, 4B is formed, and on a vertical section of the inner and outer peripheral surfaces of the bulge 13J1, a metalized layer 14J is formed over an entire surface of the vertical section. An entire surface of each of interspaces between the tapered inner peripheral surface of the bulge 3D1 and the metalized layer 14J and between the side face of the positive or negative electrode external terminal 4A, 4B and the metalized layer 14J, is filled in with a brazing material 15J and brazed.

Operational Effects of the Seventh Embodiment

In the secondary battery of the present embodiment, even if the brazing materials 15J as looked at in plan view from a principal-plane direction of the battery cover 3 have an area equal to those existing in the described embodiments, an actual brazing area can be made wider because the brazing materials layer 15J is formed on inclined surfaces. This allows joining strength of the brazing materials layer 15J to be improved and simultaneously an entry route of moisture through the brazing materials layer 15J to be extended for higher reliability against the entry of moisture.

Eighth Embodiment

An eighth embodiment in which the present invention is applied to a rectangular lithium-ion secondary battery for driving a motor vehicle is described below referring to the accompanying drawings. The present embodiment aims at changing a structure of busbars used to interconnect positive and negative electrode external terminals of adjacent secondary batteries during moduling of the secondary batteries, and thereby facilitating the interconnection between the positive and negative electrode external terminals formed from different materials.

Figure 19:
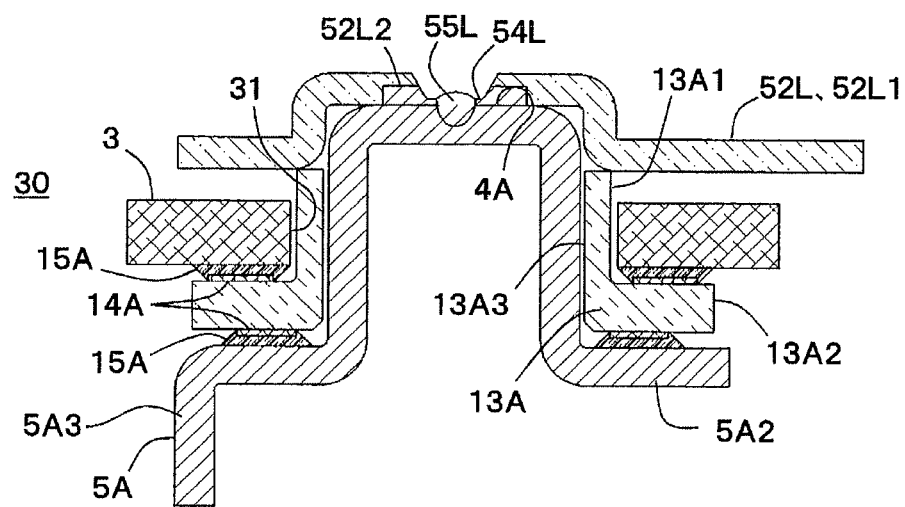
FIG. 19 is a partial sectional view of a secondary battery terminal region with a busbar welded onto a terminal in an eighth embodiment of the present invention.

FIG. 19 shows a busbar 52L used when substantially the same secondary battery 30 as in the first embodiment is disposed in plurality next to each other to construct a battery module. The busbar 52L is fabricated from a composite material of two different kinds of metals, called a cladding material. In the eighth embodiment, only the busbar 52L is of a structure different from that used in the first embodiment.

The busbar 52L has a cladded structure including a main member 52L1 and a subsidiary member 52L2, the subsidiary member being integrally pressure-formed on a neighborhood of a weld portion 55L of the main member. The main member 52L1 is made of an aluminum alloy, the same material as used in the negative electrode external terminal 4B, and the subsidiary member 52L2 is made of the same material as used in the positive electrode external terminal 4A. At and around a thin-walled portion 54L in contact with an upper surface of the positive electrode external terminal 4A, the subsidiary member 52L2 is present on an entire region in a perpendicular direction of the busbar 52L. On an upper surface of the thin-walled portion 54L, the subsidiary member 52L2 is exposed at both upper and lower surfaces of the busbar 52L. The subsidiary member 52L2 is deposited onto the positive electrode external terminal 4A, at the weld portion 55L welded with the external terminal 4A.

On the weld portion 55L, therefore, aluminum alloys are welded onto each other, but the negative electrode external terminals of adjacent secondary batteries are each Welded with the main member 52L1, or copper alloy, of the busbar 52L. In other words, copper alloys are welded onto each other on the weld portion at the negative electrode side.

Operational Effects of the Eighth Embodiment

The secondary battery of the present embodiment yields the following operational effects:

(1) During the connection of the positive and negative electrode external terminals formed from different materials, adequate electrical connection can be obtained by welding materials of the same kind onto each other, without welding an aluminum alloy and copper alloy that refuse welding connection.

(2) The fact that the subsidiary member 52L2 is present on the entire region in the perpendicular direction of the busbar 52L indicates that the busbar 52L can have a contour formed by press-blanking a partial cladding material obtained by integrating different materials in part of the cross-sectional structure and shaping the integrated member as a long plate material. A manufacturing cost of the busbar can be reduced as a result.

While an example of a busbar including the main member 52L1 of a copper alloy and the subsidiary member 52L2 of an aluminum alloy has been shown and described in the present embodiment, the busbar composition may be reversed and the terminals to which the busbar is to be connected may be changed in positive/negative polarity.

Ninth Embodiment

A ninth embodiment in which the present invention is applied to a rectangular lithium-ion secondary battery for driving a motor vehicle is described below referring to the accompanying drawings. In the present embodiment, the shape of positive and negative electrode external terminals is further changed in substantially the same configuration of the second embodiment.

Figure 20:
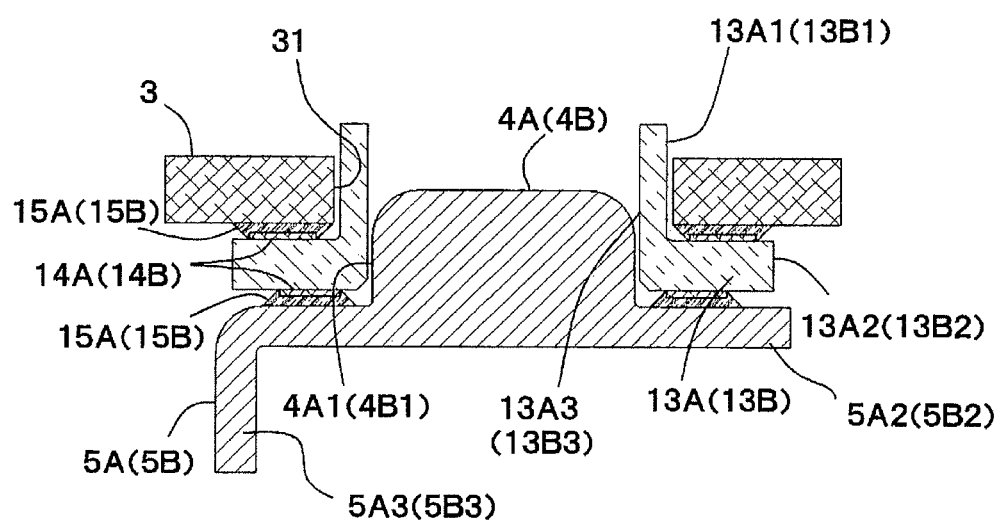
FIG. 20 is a partial sectional view showing a terminal and neighboring region of a secondary battery according to a ninth embodiment of the present invention.

As shown in FIG. 20, the battery cover 3 is pierced with substantially the same through-holes 31 as used in the first embodiment, and substantially the same insulating base materials 13A, 13B as those of the first embodiment are inserted in and fixed to the through-holes 31.

The positive and negative electrode external terminals 4A, 4B are inserted into the through-holes 31 in the insulating base materials 13A, 13B from the internal direction of the secondary battery, and the insulating base materials 13A, 13B are brazed onto the battery cover 3 and the positive and negative electrode connecting plates 5A, 5B and mechanically integrated. The positive and negative electrode external terminals 4A, 4B have a height greater than length of the through-holes 13A3, 13B3, with upper ends of each external terminal being present inside the through-holes 13A3, 13B3.

The positive and negative electrode external terminals 4A, 4B are formed by forging, each being formed into a solid cylindrical shape.

Operational Effects of the Ninth Embodiment

In the secondary battery of the present embodiment, large thickness of the positive and negative electrode external terminals 4A, 4B allows high welding quality to be obtained without deformation of the positive and negative electrode external terminals 4A, 4B, even if a contact pressure for welding busbars (not shown) onto the external terminals 4A, 4B is increased.

(Modifications)

A secondary battery of the present invention may be embodied with the following modifications:

(1) Examples of an electricity-generating element group 6 formed by flattening wound positive and negative electrode plates have been shown and described in each of the above embodiments, but the present invention is not limited to/by these embodiments. For example, the positive and negative electrode plates may be formed in layers.

Figure 21:
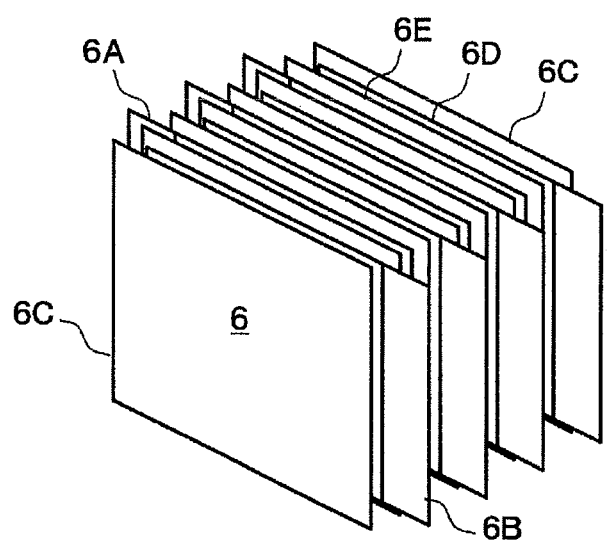
FIG. 21 is a perspective view showing another electricity-generating element group applicable to a secondary battery according to the present invention.

As shown in FIG. 21, in a layered type of electricity-generating element group 6, positive electrode plates 6E of a rectangular shape and negative electrode plates 6D also of a rectangular shape are arranged in layers at alternate positions via separators 6C of a rectangular shape. During this arrangement, each electrode plate is layered so that a non-coated positive electrode section 6A and a non-coated negative electrode section 6B are positioned across the electricity-generating element group 6. This layered type of electricity-generating element group provides substantially the same advantageous effects as those of the embodiments.

(2) The present invention does not preclude application of a rectangular secondary battery including a cylindrical electricity-generating element group 6 with wound, non-flattened positive and negative electrode plates. In such a secondary battery, a plurality of electricity-generating element groups 6 may be housed in a battery casing 1 to enhance a volumetric capacity density.

(3) The present invention can be applied to cylindrical secondary batteries and polygonal secondary batteries as well as the rectangular secondary batteries shown in the embodiments.

(4) Examples of a battery casing 1 and battery cover 3 both formed from an aluminum alloy have been shown and described in the above embodiments. The present invention, however, is not limited to/by these examples and may use a battery casing and battery cover formed from aluminum, nickel, steel, stainless steel, or other such metals. In addition, while examples of a pressure release valve 23 formed integrally with a battery cover 3 have been shown and described in the embodiments, the present invention is not limited to/by these examples and may use a pressure release valve 23 originally separate from the battery cover 3 and later integrated therewith by laser welding connection or the like.

(5) Examples of a busbar 52 formed from an aluminum alloy have been shown and described in the embodiments, but for example, a busbar made from a copper alloy may be used instead. Additionally, the busbar 52 may have a surface plated with tin, nickel, or the like.

(6) The first, third to sixth, eighth, and ninth embodiments have each presented an example in which the metalized layers 14A, 14B are formed on the upper and lower surfaces of the flanges 13A2, 13B2 of the insulating base materials and brazed onto respectively the lower surface of the battery cover 3 (i.e., the inner side face of the secondary battery 30) and the face of the positive or negative electrode connecting plate 5A, 5B that is parallel to the battery cover 3. Instead, the metalized layers may each be formed on the wall 13A1, 13B1 of one insulating base material 13A, 13B and on a face opposite to the wall thereof, that is, on an outer or inner vertical surface of a can-shaped member, and brazed onto the inner surface of one through-hole 31 in the battery cover 3 and the side face 4A1, 4B1 of the positive or negative electrode connecting plate 5A, 5B, respectively. Otherwise, brazing may be done at the interfaces between the inner surface and the side face.

(7) Although examples of positive and negative electrode external terminals 4A, 4B each having a cross-sectionally circular bump or recess or having a circular plane have been shown and described in the embodiments, the shapes of these regions may be oval, elliptical, rectangular, or the like.

At this time, these shapes may be oriented so that respective sizes in a direction parallel to a longer side of the battery cover 3 are greater than those of a direction perpendicular to the longer side, or so that as opposed to this, the respective sizes in the direction parallel to the longer side of the battery cover 3 are smaller than those of the direction perpendicular to the longer side.

(8) In the first and third to fifth embodiments, the thin-walled portion 54 has been provided at the sections of the busbar 52 that are welded, but the thin-walled portion may be a through-hole, in which case, when the positive or negative electrode external terminal 4A, 4B and the busbar are connected, laser beam scans circling along a peripheral region of the through-hole will take place and the periphery of the through-hole and the positive or negative electrode external terminal 4A, 4B will be welded together. In addition, at this time, the section of the positive or negative electrode external terminal 4A, 4B that corresponds to the through-hole will desirably include a bulge matching to thickness of the through-hole section.

(9) In each of the above embodiments, the through-holes 31A, 31B have been provided on the band-plate-shaped battery cover 3 of the deep-draw-molded battery casing 1 and the external terminals 4A, 4B have been provided in a form appropriate for the through-holes. In a case that a shallow flat battery casing is to be used, however, the present invention can also be applied to a secondary battery in which through-holes are provided on band-plate-shaped side faces of the flat battery casing and as in the embodiments, external terminals are provided in a form appropriate for the through-holes.

(10) The above has described the embodiments in which electrical insulation and sealing between the battery cover and the external terminals are implemented with the ceramics-made insulating base materials and the three kinds of members are integrated by brazing. The present invention, however, can also be applied to secondary batteries whose insulating base materials have been previously integrated with a battery cover and external terminals by caulking.

The present invention is not limited to/by the described embodiments or modifications. The invention can therefore be applied to secondary batteries each including: an electricity-generating element group formed by stacking in layers via separators a positive electrode plate coated with a positive electrode active material, and a negative electrode plate coated with a negative electrode active material, the electricity-generating element group further including portions, of the positive electrode plate and negative electrode plate, that are not coated with the positive electrode active material or negative electrode active material; a battery container accommodating the electricity-generating element group; and a positive electrode external terminal and a negative electrode external terminal, each exposed outward from one of two through-holes, one for a positive electrode and the other for a negative electrode, in the battery container in order to conduct electric power charging/discharging between the electricity-generating element group and an external load, wherein: a positive electrode connecting plate and a negative electrode connecting plate are each fabricated from a single blank material; an electricity-generating element connection portion connected to the electricity-generating element group is formed on a first face at one end of each of the positive and negative electrode connecting plates; the positive or negative electrode external terminal is formed on a second face at the other end of each of the connecting plates; and the second faces of the positive and negative electrode connecting plates are exposed from the through-holes in parallel to the battery container; and the invention can also be applied to battery modules each using the above secondary battery.

The invention claimed is:

1. A secondary battery comprising:
an electricity-generating element group formed by stacking in layers via separators a positive electrode connecting plate coated with a positive electrode active material, and a negative electrode connecting plate coated with a negative electrode active material, the electricity-generating element group further including portions, of the positive electrode plate and negative electrode plate, that are not coated with the positive electrode active material or negative electrode active material;
a battery container accommodating the electricity-generating element group;
a positive electrode external terminal and a negative electrode external terminal, each exposed outward from one of two through-holes, one for a positive electrode and the other for a negative electrode, in the battery container in order to conduct electric power charging/discharging between the electricity-generating element group and an external load; and
an insulating base material disposed in close contact with an entire edge surface of each through-hole and with entire wall surfaces of the positive and negative electrode terminals at the positive and negative electrode connecting plates, wherein:

the positive electrode connecting plate and the negative electrode connecting plate are each fabricated from a single blank material;
an electricity-generating element connection portion connected to the electricity-generating element group is formed on a first face at one end of each of the positive and negative electrode connecting plates;
the positive or negative electrode external terminal is formed on a second face at the other end of each of the connecting plates;
the second faces of the positive and negative electrode connecting plates are exposed from the through-holes in parallel to an outer surface of the battery container;
the battery container includes a battery casing and a battery cover sealing an opening in the battery casing, the battery cover including the through-hole for the positive electrode and the through-hole for the negative electrode; and
the insulating base material covers upper and lower surfaces of the battery cover and seals the battery cover.

2. The secondary battery according to claim 1, wherein:
the second faces serving as the positive and negative electrode external terminals are parallel to the battery cover.

3. The secondary battery according to claim 2, further comprising:
insulating base materials each include a cylindrical section having a base material through-hole centrally therein, the cylindrical section being inserted between the positive electrode connecting plate and the through-hole for the positive electrode, as well as between the negative electrode connecting plate and the through-hole for the negative electrode, and the insulating base materials electrically insulating the battery cover and the positive and negative electrode connecting plates from each other;
wherein the battery container internally is hermetically sealed with the insulating base materials and the battery cover mechanically connected to each other, as well as with the insulating base materials and the positive and negative electrode connecting plates mechanically connected to each other.

4. The secondary battery according to claim 3, wherein the insulating base materials are each formed from ceramic, the insulating base materials being connected to the positive electrode connecting plate and the negative electrode connecting plate as well as to the battery cover, via independent brazing materials.

5. The secondary battery according to claim 2, wherein the insulating base materials are resins formed between the positive electrode connecting plate and the through-hole for the positive electrode, between the negative electrode connecting plate and the through-hole for the negative electrode, and between the battery cover and them, by shaping via a mold.

6. The secondary battery according to claim 3, wherein the positive electrode external terminal and the negative electrode external terminal are protrusively provided on the positive electrode connecting plate and the negative electrode connecting plate, respectively, so as to enter the base material through-holes.

7. The secondary battery according to claim 6, wherein the second faces of the positive and negative electrode external terminals each protrude externally with respect to the battery container.

8. The secondary battery according to claim 6, wherein the second faces of the positive and negative electrode external terminals are each positioned inside the base material through-hole of the relevant insulating base material as well as inside the through-hole for the positive or negative electrode.

9. The secondary battery according to claim 3, wherein the second faces of the positive electrode connecting plate and the negative electrode connecting plate are each formed into a shape of a recessed portion opposed to one of the base material through-holes, inside the battery container.

10. The secondary battery according to claim 3, wherein the second faces of the positive electrode connecting plate and the negative electrode connecting plate are each formed into a shape of a planar portion opposed to one of the base material through-holes, inside the battery container.

11. A secondary battery module comprising:
a plurality of secondary batteries arranged adjacently to and in parallel to each other, the secondary batteries each being the secondary battery according to claim 1; and
busbars electrically interconnecting the positive electrode external terminals and negative electrode external terminals of the adjacent secondary batteries;
wherein:
  the busbars are each formed from a cladding material whose main member, made of the same material as used in one of the positive and negative electrode external terminals, and whose subsidiary member, made of the same material as used in the other of the positive and negative electrode external terminals, are integrated;
  the main member or the subsidiary member of one of the busbars that is made of the same material as used in the positive electrode external terminal is welded onto the positive electrode external terminal; and
  the main member or the subsidiary member of the other of the busbars that is made of the same material as used in the negative electrode external terminal is welded onto the negative electrode external terminal.

12. The secondary battery module according to claim 11, wherein
a thin-walled portion is provided on a weld section of each of the busbars.

13. The secondary battery module according to claim 11, wherein
a through-hole is provided on a weld section of each of the busbars.

\* \* \* \* \*